(12) United States Patent
Komura et al.

(10) Patent No.: US 8,015,050 B2
(45) Date of Patent: Sep. 6, 2011

(54) OPERATION SUPPORTING SYSTEM AND OPERATION SUPPORTING METHOD

(75) Inventors: Akinori Komura, Kanagawa (JP); Yoshifumi Matsunaga, Kanagawa (JP); Kazuo Shibuta, Kanagawa (JP); Hideto Yuzawa, Kanagawa (JP); Tomokazu Yago, Kanagawa (JP); Hiroyuki Hattori, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1661 days.

(21) Appl. No.: 11/222,110

(22) Filed: Sep. 9, 2005

(65) Prior Publication Data
US 2006/0179187 A1    Aug. 10, 2006

(30) Foreign Application Priority Data
Feb. 3, 2005    (JP) .................. 2005-027670

(51) Int. Cl.
*G06Q 10/00*    (2006.01)
(52) U.S. Cl. .................. 705/7.22; 705/7.42
(58) Field of Classification Search ........... 705/3, 7, 705/9, 11
See application file for complete search history.

(56) References Cited

U.S. PATENT DOCUMENTS

| | | | | |
|---|---|---|---|---|
| 4,805,107 A * | 2/1989 | Kieckhafer et al. | ........... | 714/4 |
| 5,148,370 A * | 9/1992 | Litt et al. | ........... | 700/104 |
| 5,208,912 A * | 5/1993 | Nakayama et al. | ........... | 709/205 |
| 5,247,615 A * | 9/1993 | Mori et al. | ........... | 709/205 |
| 5,402,350 A * | 3/1995 | Kline | ........... | 700/101 |
| 5,461,611 A * | 10/1995 | Drake et al. | ........... | 370/420 |
| 5,539,886 A * | 7/1996 | Aldred et al. | ........... | 719/318 |
| 5,576,215 A * | 11/1996 | Burns et al. | ........... | 436/50 |
| 5,649,105 A * | 7/1997 | Aldred et al. | ........... | 709/220 |
| 5,694,548 A * | 12/1997 | Baugher et al. | ........... | 709/227 |
| 6,182,146 B1 * | 1/2001 | Graham-Cumming, Jr. | . | 709/238 |
| 6,564,245 B1 * | 5/2003 | Fukasawa et al. | ........... | 709/205 |
| 6,915,290 B2 * | 7/2005 | Bestgen et al. | ........... | 1/1 |
| 7,567,504 B2 * | 7/2009 | Darling et al. | ........... | 370/216 |
| 7,590,736 B2 * | 9/2009 | Hydrie et al. | ........... | 709/226 |
| 7,613,822 B2 * | 11/2009 | Joy et al. | ........... | 709/235 |
| 2004/0128189 A1 | 7/2004 | Hirano et al. | | |

FOREIGN PATENT DOCUMENTS

| | | |
|---|---|---|
| JP | 7-56748 A | 3/1995 |
| JP | 2002-049745 A | 2/2002 |
| JP | 2003-141234 A | 5/2003 |
| JP | 2004-185078 A | 7/2004 |

OTHER PUBLICATIONS

Blau, Gary_Mehta, Bharat_Bose, Shantanu_Pekny, Joe_Sinclair, Gavin_Keunker, Kay_Bunch, Paul, 2000, Risk Management in the Development of New Products in Highly Regulated Industries, Computers and Chemical Engineering, 24 (2000), pp. 659-664.*

Japanese Office Action, mailed Jun. 29, 2010 in the corresponding Japanese Application.

* cited by examiner

*Primary Examiner* — Jonathan G. Sterrett
*Assistant Examiner* — Stephen Swartz
(74) *Attorney, Agent, or Firm* — Sughrue Mion, PLLC

(57) ABSTRACT

There is provided an operation supporting apparatus including a memory portion that stores characteristics of an operation to be multiplexed, and a determination portion that determines appropriateness of multiple operations to be multiplexed on the basis of the characteristics thereof stored in the memory portion.

19 Claims, 21 Drawing Sheets

FIG. 3

| No. | TASK NAME | TASK TYPE | OPERATION FORM | OPERATION MODE | ATTITUDE | TASK CONTINUOUSNESS | PARTITIVITY | OPERATION TYPE | USED ORGAN | TASK IMPLEMENTATION MODE | IMPORTANCE |
|---|---|---|---|---|---|---|---|---|---|---|---|
| 1 | RESEARCH REPORT (LISTENER) | TIME CONSTRAINT | INFORMATION INPUT | 1 - n | PASSIVE | | | | | | |
| 2 | BUSINESS TRIP REPORT (LISTENER) | TIME CONSTRAINT | INFORMATION INPUT | 1 - n | PASSIVE | | | | | | |
| 3 | MONTHLY, WEEKLY REPORT (LISTENER) | TIME CONSTRAINT | INFORMATION INPUT | 1 - n | PASSIVE | | | | | | |
| 4 | TECHNOLOGY INVESTIGATION (PARTICIPANT) | TIME CONSTRAINT | BI-DIRECTIONAL | n - n | ACTIVE | | | | | | |
| 5 | STRATEGY INVESTIGATION (PARTICIPANT) | TIME CONSTRAINT | BI-DIRECTIONAL | n - n | ACTIVE | | | | | | |
| 6 | PATENT INVESTIGATION (PARTICIPANT) | TIME CONSTRAINT | BI-DIRECTIONAL | n - n | ACTIVE | | | | | | |
| 7 | PLANNING INVESTIGATION (PARTICIPANT) | TIME CONSTRAINT | BI-DIRECTIONAL | n - n | ACTIVE | | | | | | |
| 8 | SYSTEM CHANGE BRIEFING (LISTENER) | TIME CONSTRAINT | INFORMATION INPUT | 1 - n | PASSIVE | | | | | | |
| 9 | LECTURE MEETING (LISTENER) | TIME CONSTRAINT | INFORMATION INPUT | 1 - n | PASSIVE | | | | | | |
| 10 | BUSINESS NEGOTIATION | TIME CONSTRAINT | BI-DIRECTIONAL | 1 - 1 | ACTIVE | | | | | | |
| 11 | HEALTH, CAREER CONSULTATION (CONSULTOR) | TIME CONSTRAINT | BI-DIRECTIONAL | 1 - 1 | ACTIVE | | | | | | |
| 12 | RATING INTERVIEW (DEMONSTRATOR) | TIME CONSTRAINT | INFORMATION INPUT | 1 - 1 | ACTIVE | | | | | | |
| 13 | INQUIRY (CONSULTOR) | TIME CONSTRAINT | BI-DIRECTIONAL | 1 - 1 | ACTIVE | | | | | | |
| 14 | TELEPHONE | TIME CONSTRAINT | BI-DIRECTIONAL | 1 - 1 | ACTIVE | | | | | | |
| 15 | PATENT DRAFTING | UNIT GROUP | INFORMATION INPUT | SOLE | ACTIVE | | | | | | |
| 16 | REPORT WRITING | UNIT GROUP | INFORMATION INPUT | SOLE | ACTIVE | | | | | | |
| 17 | BRIEFING MATERIAL CREATION | UNIT GROUP | INFORMATION INPUT | SOLE | ACTIVE | | | | | | |
| 18 | PLANNING FOR SOLUTION | UNIT GROUP | INFORMATION INPUT | SOLE | ACTIVE | | | | | | |
| 19 | BUSINESS PLANNING | UNIT GROUP | INFORMATION INPUT | SOLE | ACTIVE | | | | | | |
| 20 | SOFTWARE INSTALLATION | UNIT GROUP | INFORMATION INPUT | SOLE | ACTIVE | | | | | | |
| 21 | VIRUS PREVENTION | UNIT GROUP | INFORMATION INPUT | SOLE | ACTIVE | | | | | | |
| 22 | SIMULATION | UNIT GROUP | INFORMATION INPUT | SOLE | ACTIVE | | | | | | |
| 23 | TABLE DATA INPUT | UNIT GROUP | INFORMATION INPUT | SOLE | ACTIVE | | | | | | |
| 24 | PATENT, DOCUMENT, MATERIAL RETRIEVAL | UNIT GROUP | INFORMATION INPUT | SOLE | ACTIVE | | | | | | |
| 25 | UNDERSTAND MATERIAL CONTENT | UNIT GROUP | INFORMATION INPUT | SOLE | ACTIVE | | | | | | |
| 26 | PATENT ABSTRACT | UNIT GROUP | BI-DIRECTIONAL | SOLE | ACTIVE | | | | | | |
| 27 | EVALUATION OF PATENT CONTENT, CONFLICT INVESTIGATION | UNIT GROUP | INFORMATION INPUT | SOLE | ACTIVE | | | | | | |
| 28 | MAIL (READ CONTENT) | UNIT GROUP | INFORMATION INPUT | SOLE | ACTIVE | | | | | | |
| 29 | MAIL (CREATE REPLY) | UNIT GROUP | INFORMATION INPUT | SOLE | ACTIVE | | | | | | |
| 30 | WBT (e-LEARNING) | UNIT GROUP | INFORMATION INPUT | SOLE | PASSIVE | | | | | | |
| 31 | PROCESS OF APPLICATION | UNIT GROUP | INFORMATION INPUT | SOLE | ACTIVE | | | | | | |
| 32 | INVENTORY CONTROL | UNIT GROUP | INFORMATION INPUT | SOLE | ACTIVE | | | | | | |
| 33 | MATERIAL ORDER PLACEMENT | UNIT GROUP | INFORMATION INPUT | SOLE | ACTIVE | | | | | | |
| 34 | ......... | | | | | | | | | | |

CHARACTERISTICS OF TASK 2

| CHARACTERISTICS OF TASK 2 | |
|---|---|
| TIME (MINUTE) | TAI |
| 0 | x0 |
| T1 | x1 |
| T2 | x2 |
| T3 | x3 |
| T4 | x4 |
| T5 | x5 |
| T0 | END |

DIAGRAM OF TASK 2

FIG. 6

| TASK NAME | UAT (MINUTE) | UN (RESPECTIVE) | WHOLE OPERATION PERIOD (MINUTE) |
|---|---|---|---|
| A | yA | zA | yA*zA |
| B | yB | zB | yB*zB |

DETERMINATION OF MULTIPLEXING OF TASK 1

| CHARACTERISTICS OF TASK 1 | | DETERMINATION OF MULTIPLEXING WITH TASK A | | | | |
|---|---|---|---|---|---|---|
| TIME (MINUTE) | TAj | COMPARE | UAT | COMPARE | PERIOD FOR MULTIPLEXING | YES/NO |
| 0 | x0 | < | yA | < | T1-0 | NO |
| T1 | x1 | > | yA | < | T2-T1 | YES |
| T2 | x2 | < | yA | < | T3-T2 | NO |
| T3 | x3 | > | yA | < | T4-T3 | YES |
| T4 | x4 | < | yA | < | T5-T4 | NO |
| T5 | x5 | > | yA | < | T6-T5 | YES |
| T6 | x6 | > | yA | < | T7-T6 | YES |
| T7 | x7 | < | yA | < | T8-T7 | NO |
| T8 | x8 | > | yA | < | T0-T8 | YES |
| T0 | END | – | – | – | – | – |

TA(1)=T0-T8+T7-T5+T4-T3+T2-T1 t1=T2-T1 t2=T4-T3 t3=T7-T5 t4=T0-T8

DIAGRAM OF TASK 1

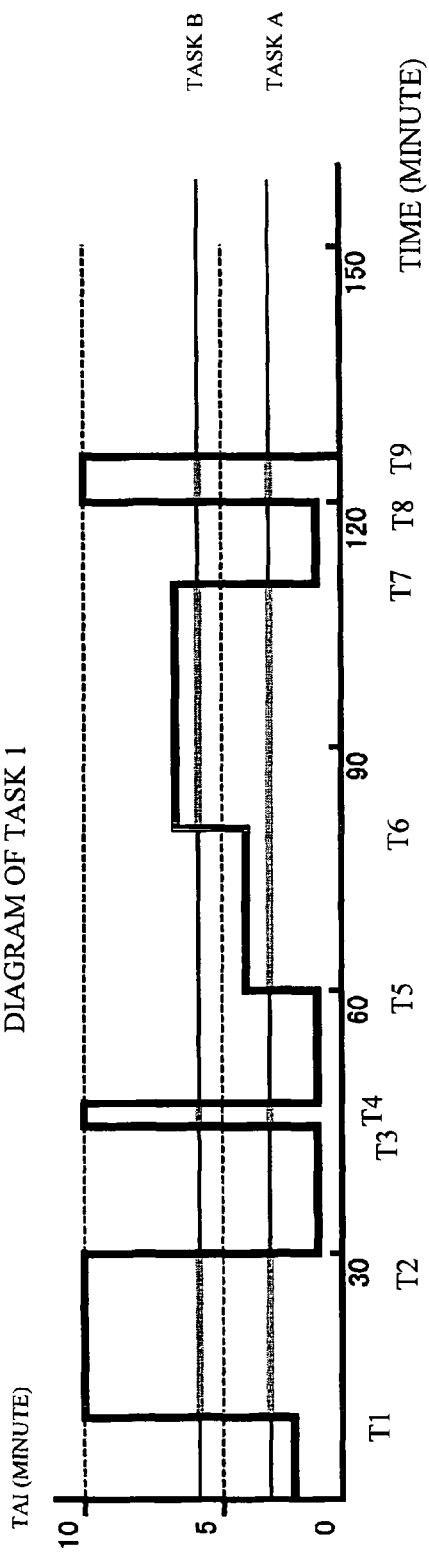

FIG. 9A  DIAGRAM OF TASK 2

FIG. 10A  T: PERIOD FOR MULTIPLEXING (MINUTE)

| TASK # | A | B |
|---|---|---|
| 1 | TA(1) | TB(1) |
| 2 | TA(2) | TB(2) |

FIG. 10B  MR: MULTIPLEX EXECUTION RATIO

| TASK # | A | B |
|---|---|---|
| 1 | TA(1)/T0(1) | TB(1)/T0(1) |
| 2 | TA(2)/T0(2) | TB(2)/T0(2) |

FIG. 10C  PERIODS FOR MULTIPLEXING POTENTIAL TASK

| COMBINATION # | COMBINATION | | SUM OF PERIODS | ΣMR: SUM OF MULTIPLEXING EXECUTION RATIOS |
|---|---|---|---|---|
| ① | 1–A | 2–B | TA(1)+TB(2) | TA(1)/T0(1)+TB(2)/T0(2) |
| ② | 1–B | 2–A | TB(1)+TA(2) | TB(1)/T0(1)+TA(2)/T0(2) |

FIG. 10D  EFFICIENT TASK COMBINATION

| PRIORITY | COMBINATION | | SUM OF PERIODS | ΣMR: SUM OF MULTIPLEXING EXECUTION RATIOS |
|---|---|---|---|---|
| 1 | 1–A | 2–B | TA(1)+TB(2) | TA(1)/T0(1)+TB(2)/T0(2) |
| 2 | 1–B | 2–A | TB(1)+TA(2) | TB(1)/T0(1)+TA(2)/T0(2) |

TER: TASK EXECUTION RATIO (%)

| TASK NAME | A | B |
|---|---|---|
| 1 | TA(1)/(yA*zA) | TB(1)/(yB*zB) |
| 2 | TA(2)/(yA*zA) | TB(2)/(yB*zB) |

FIG. 11B

EFFICIENT TASK COMBINATION

| PRIORITY | COMBINATION | | ΣT: SUM OF PERIODS (MINUTE) | ΣMR: SUM OF MULTIPLEXING EXECUTION RATIOS (%) | ΣTER: SUM OF TASK EXECUTION RATIOS (%) |
|---|---|---|---|---|---|
| 1 | 1–A | 2–B | TA(1)+TB(2) | TA(1)/T0(1)+ TB(2)/T0(2) | TA(1)/(yA*zA)+ TB(2)/(yB*zB) |
| 2 | 1–B | 2–A | TB(1)+TA(2) | TB(1)/T0(1)+ TA(2)/T0(2) | TB(1)/(yB*zB)+ TA(2)/(yA*zA) |

CHCRACTERISTICS OF TASK 11

CHCRACTERISTICS OF TASK OF
TIME-CONSTRAINT TYPE (TASK 11)

| TIME (MINUTE) | TAI |
|---|---|
| 0 | 2 |
| 10 | 10 |
| 30 | 1 |
| 45 | 10 |
| 47 | 1 |
| 60 | 4 |
| 80 | 7 |
| 110 | 1 |
| 120 | 10 |
| 125 | END |

DIAGRAM OF TASK 11

CHCRACTERISTICS OF TASK OF
TIME-CONSTRAINT TYPE (TASK 22)

CHCRACTERISTICS OF TASK 22

| TIME (MINUTE) | TAI |
|---|---|
| 0 | 2 |
| 10 | 5 |
| 40 | 10 |
| 70 | 8 |
| 80 | 7 |
| 140 | 5 |
| 150 | END |

DIAGRAM OF TASK 22

CHCRACTERISTICS OF TASK 33

CHCRACTERISTICS OF TASK OF
TIME-CONSTRAINT TYPE (TASK 33)

| TIME (MINUTE) | TAI |
|---|---|
| 0 | 5 |
| 10 | 2 |
| 30 | 5 |
| 40 | 2 |
| 60 | 5 |
| 70 | 2 |
| 90 | 5 |
| 100 | 2 |
| 120 | END |

DIAGRAM OF TASK 33

FIG. 16

CHARACTERISTICS OF TASK OF UNIT GROUP TYPE

| TASK NAME | UAT (MINUTE) | UN | OPERATION PERIOD (MINUTE) |
|---|---|---|---|
| TASK AA | 3 | 60 | 180 |
| TASK BB | 6 | 20 | 120 |
| TASK CC | 0.5 | 300 | 150 |

TAI CHCRACTERISTICS OF TASK 11

| TIME (MINUTE) | TAI |
|---|---|
| 0 | 2 |
| 10 | 10 |
| 30 | 1 |
| 45 | 10 |
| 47 | 1 |
| 60 | 4 |
| 80 | 7 |
| 110 | 1 |
| 120 | 10 |
| 125 | END |

| TASK | UAT | T |
|---|---|---|
| AA | 3 | 75 |
| BB | 6 | 50 |
| CC | 0.5 | 125 |

FIG. 18A
TAI CHCRACTERISTICS OF TASK 22
| TIME (MINUTE) | TAI |
|---|---|
| 0 | 2 |
| 10 | 10 |
| 30 | 1 |
| 45 | 10 |
| 47 | 1 |
| 60 | 4 |
| 80 | 7 |
| 110 | 1 |
| 120 | 10 |
| 125 | END |
FIG. 18B
| TASK | UAT | T |
|---|---|---|
| AA | 3 | 75 |
| BB | 6 | 50 |
| CC | 0.5 | 125 |
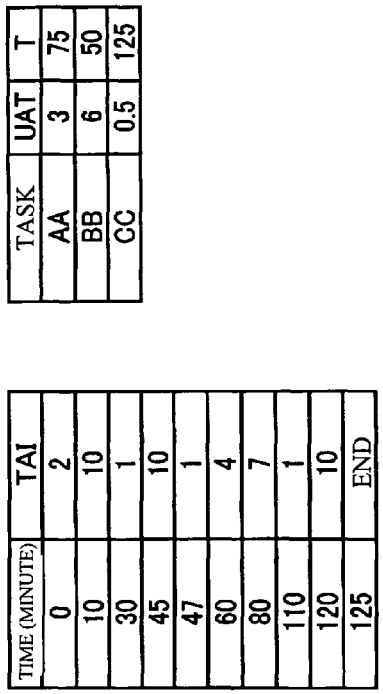
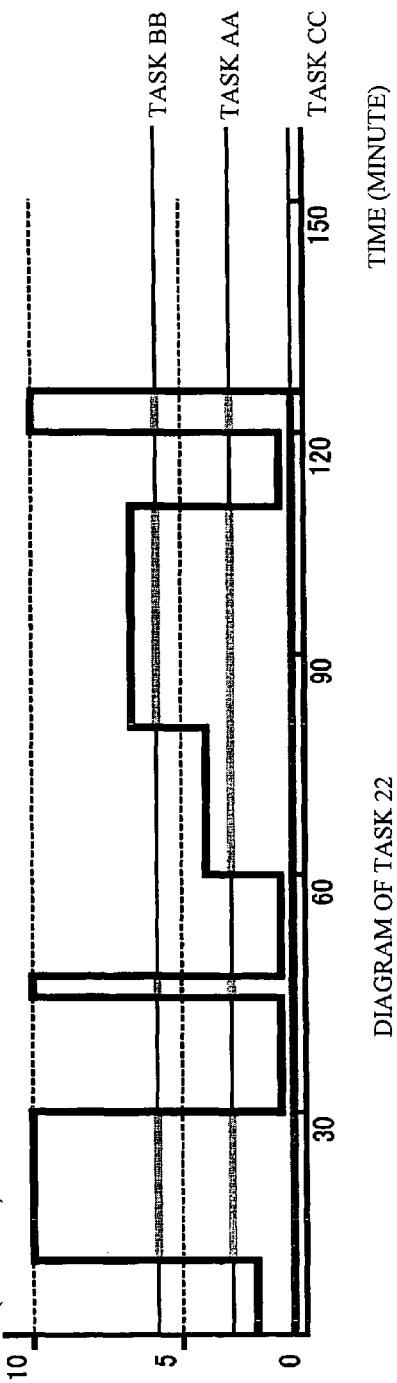
FIG. 18C
DIAGRAM OF TASK 22

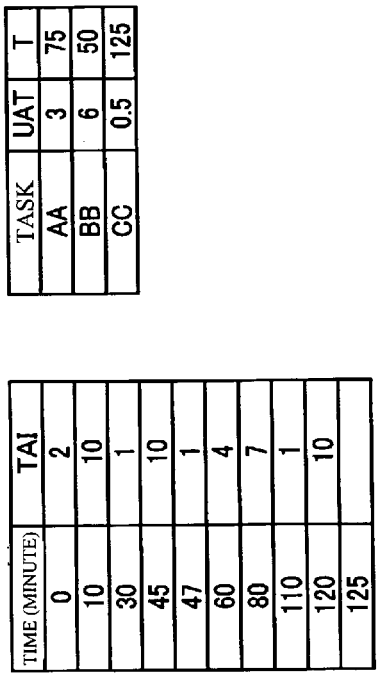
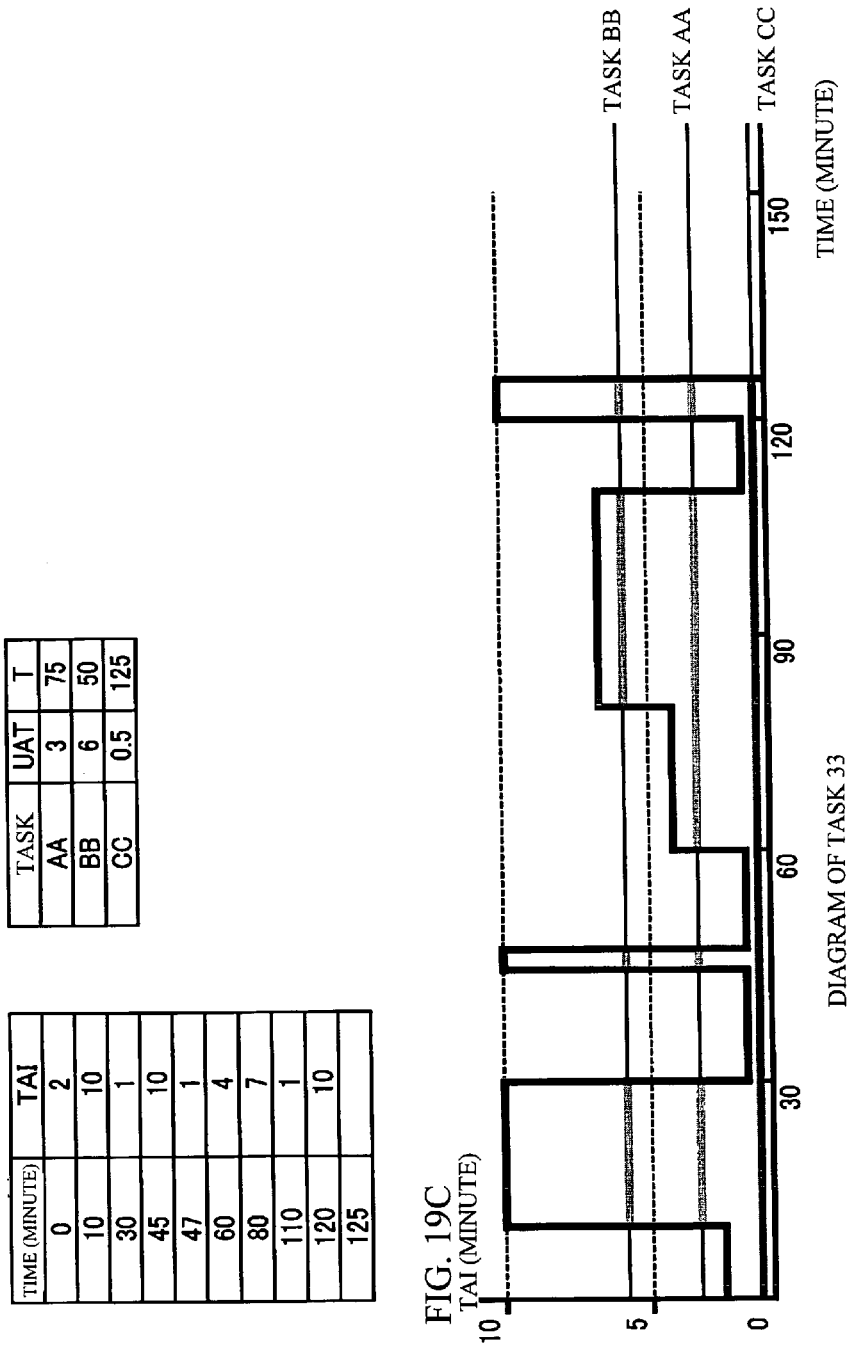

FIG. 20A  T: PERIOD FOR MULTIPLEXING (MINUTE)

| TASK # | AA | BB | CC |
|---|---|---|---|
| 11 | 140 | 100 | 150 |
| 22 | 40 | 0 | 120 |
| 33 | 75 | 50 | 125 |

FIG. 20B  MR: MULTIPLEX EXECUTION RATIO

| TASK # | AA | BB | CC |
|---|---|---|---|
| 11 | 93 | 67 | 100 |
| 22 | 33 | 0 | 100 |
| 33 | 60 | 40 | 100 |

FIG. 20C  PERIODS FOR MULTIPLEXING POTENTIAL TASK

| # | COMBINATION | | | ΣT: SUM OF PERIODS FOR MULTIPLEXING (%) | ΣMR: SUM OF MULTIPLEXING EXECUTION RATIOS (%) |
|---|---|---|---|---|---|
| ① | 11-AA | 22-BB | 33-CC | 265 | 193 |
| ② | 11-AA | 22-CC | 33-BB | 310 | 233 |
| ③ | 11-BB | 22-AA | 33-CC | 265 | 200 |
| ④ | 11-BB | 22-CC | 33-AA | 295 | 227 |
| ⑤ | 11-CC | 22-AA | 33-BB | 240 | 173 |
| ⑥ | 11-CC | 22-BB | 33-AA | 225 | 160 |

FIG. 20D  EFFICIENT TASK COMBINATION

| PRIORITY | COMBINATION | | | ΣT: SUM OF PERIODS FOR MULTIPLEXING (%) | ΣMR: SUM OF MULTIPLEXING EXECUTION RATIOS (%) |
|---|---|---|---|---|---|
| 1 | 11-AA | 22-CC | 33-BB | 310 | 233 |
| 2 | 11-BB | 22-CC | 33-AA | 295 | 227 |
| 3 | 11-BB | 22-AA | 33-CC | 265 | 200 |
| 4 | 11-AA | 22-BB | 33-CC | 265 | 193 |
| 5 | 11-CC | 22-AA | 33-BB | 240 | 173 |
| 6 | 11-CC | 22-BB | 33-AA | 225 | 160 |

FIG. 21A  TER: TASK EXECUTION RATIO (%)

| TASK NAME | AA | BB | CC |
|---|---|---|---|
| 11 | 78 | 83 | 100 |
| 22 | 22 | 0 | 100 |
| 33 | 42 | 42 | 83 |

FIG. 21B  EFFICIENT TASK COMBINATION

| PRIORITY | COMBINATION | | | ΣT: SUM OF PERIODS (MINUTE) | ΣMR: SUM OF MULTIPLEXING EXECUTION RATIOS (%) | ΣTER: SUM OF TASK EXECUTION RATIOS (%) |
|---|---|---|---|---|---|---|
| 1 | 11–AA | 22–CC | 33–BB | 310 | 233 | 219 |
| 2 | 11–BB | 22–CC | 33–AA | 295 | 227 | 225 |
| 3 | 11–BB | 22–AA | 32–CC | 265 | 200 | 189 |
| 4 | 11–AA | 22–BB | 33–CC | 265 | 193 | 161 |
| 5 | 11–CC | 22–AA | 33–BB | 240 | 173 | 164 |
| 6 | 11–CC | 22–BB | 33–AA | 225 | 160 | 142 |

OPERATION SUPPORTING SYSTEM AND OPERATION SUPPORTING METHOD

BACKGROUND OF THE INVENTION

1. Field of the Invention

This invention relates to an operation supporting system and an operation supporting method.

2. Description of the Related Art

In these years, it is demanding that the operation should be processed more efficiently, as the operation quantity increases. The efficiency of the operation is progressively promoted by reviewing and creating manuals of implementation process and utilizing the IT technologies. Under the circumstances, it is to be noted that people have to determine respective nonroutine tasks individually, but the nonroutine tasks are not sufficiently promoted. However, there is the increasing demand that multiple operations have to be processed in parallel in today's office. For example, one worker or one apparatus is made to implement a first process. While waiting for the completion of the first process, a second process is also started. When the first process is completed, the second process is interrupted or stopped to return to the first process. This type of multiplexing can be seen regularly. On the other hand, there is the problem in that the difficulty in scheduling delays the operation and applies overloads on the workers. This is because the operations tied up to time such as conference are increasing.

Generally, multi-window system, as represented by MS-WINDOW or X-WINDOW, is well known for the technique of carrying out multiple operations simultaneously. The user utilizes multiple windows when carrying out multiple operations, and sequentially selects the windows to perform multiple operations in parallel.

Japanese Patent Application Publication No. 7-56748 (hereinafter, referred to as Document 1) discloses an apparatus as described below. While the user is carrying out an operation with the use of a PC (Personal Computer), this operation is interrupted when another operation breaks in. The progress of the breaking operation is managed by confirming the operation status of the application, and then the apparatus notifies the user when the interrupted operation can be restarted.

There is the problem, however, that appropriate multiplexing or multitasking is not always realized, because each operator determines a combination of multiple operations to be multiplexed. More specifically, it is inefficient, if the operations are not multiplexed while the operator is implementing just a single operation. It is also inefficient, if the operator is implementing an inappropriate combination of multiple operations according to the operator's improper determination.

SUMMARY OF THE INVENTION

The present invention has been made in view of the above circumstances and provides an operation supporting system, method, and program that support an operator doing multiple operations in parallel.

According to one aspect of the present invention, there may be provided an operation supporting apparatus including a memory portion that stores characteristics of an operation to be multiplexed, and a determination portion that determines appropriateness of multiple operations to be multiplexed on the basis of the characteristics thereof stored in the memory portion.

According to another aspect of the present invention, there may be provide an operation supporting method including registering characteristics of operations to be multiplexed, and determining appropriateness of multiple operations to be multiplexed on the basis of the characteristics thereof stored in the memory portion.

According to a further aspect of the present invention, there may be provided a storage medium readable by a computer, the storage medium storing a program of instructions executable by the computer to perform the function for operation supporting including obtaining characteristics of an operation to be multiplexed, and determining appropriateness of multiple operations to be multiplexed on the basis of the characteristics thereof.

According to the present invention, multiple operations can be processed in parallel in a more efficient manner, by determining the appropriateness of multiple operations to be multiplexed based on the characteristics of the operation to be multiplexed.

BRIEF DESCRIPTION OF THE DRAWINGS

Embodiments of the present invention will be described in detail based on the following figures, wherein:

FIG. 3 is a view showing task characteristics;

FIG. 6 shows a table of characteristics of tasks A and B of a unit group type;

FIG. 8A is a diagram schematically showing the task 1 and the tasks A and B to be multiplexed;

FIG. 8B is a table for determining to the tasks A and B and the task 1 to be multiplexed;

FIG. 9A is a diagram schematically showing the task 2 and the tasks A and B to be multiplexed;

FIG. 10A is a table showing the periods for multiplexing combinations of the tasks;

FIG. 10B is a table showing multiplexing execution ratios of all combinations of the tasks;

FIG. 10C is a table showing the periods of task candidates to be multiplexed and sums of the multiplexing execution ratios;

FIG. 10D is a table showing priorities of the periods of task candidates to be multiplexed, the periods for multiplexing thereof, and the multiplexing execution ratios thereof;

FIG. 11A is a table showing all the combinations of the task execution ratios (TER) of the tasks 1 and 2 of the time-constraint type and the task A and B of the unit group type;

FIG. 11B is a table showing the priorities of the combinations of the task candidates to be multiplexed and the sums of the task execution ratios thereof;

FIG. 16 shows the characteristics of the unit accomplishment times (UAT) of the tasks of the unit group type (AA, BB, and CC);

FIG. 18A is a table showing the elapsed time and the task attention intervals (TAI) thereof when the TAI varies in the whole operation period of the task of the time-constraint type 22;

FIG. 18B is a table showing the unit accomplishment times (UAT) and periods T used for multiplexing the three tasks of the unit group type;

FIG. 18C is a diagram of the tables shown in FIGS. 18A and 18B.

FIG. 19A is a table showing the elapsed time and the task attention intervals (TAI) thereof when the TAI varies in the whole operation period of the task of the time-constraint type 33;

FIG. 19B is a table showing the unit accomplishment times (UAT) and periods T used for multiplexing the three tasks of the unit group type;

FIG. 19C is a diagram of the tables shown in FIGS. 19A and 19B;

FIG. 20A is a table showing the periods for multiplexing (T) the respective tasks of the unit group type;

FIG. 20B is a table showing the multiplex execution ratios (MR);

FIG. 20C is a table showing the sums of the periods for multiplexing (T) and the sums of the multiplex execution ratios (MR) of the respective tasks of the unit group type;

FIG. 20D is a table showing the priorities of efficient task combinations with reference to the sums of the periods for multiplexing;

FIG. 21A is a table showing the task execution ratio (TER) of all the tasks; and FIG. 21B is a table showing the sum of the task execution ratios together with the priorities of the efficient task combinations shown in FIG. 20D, on the basis of the task execution ratios.

DESCRIPTION OF THE EMBODIMENTS

Figure 1:
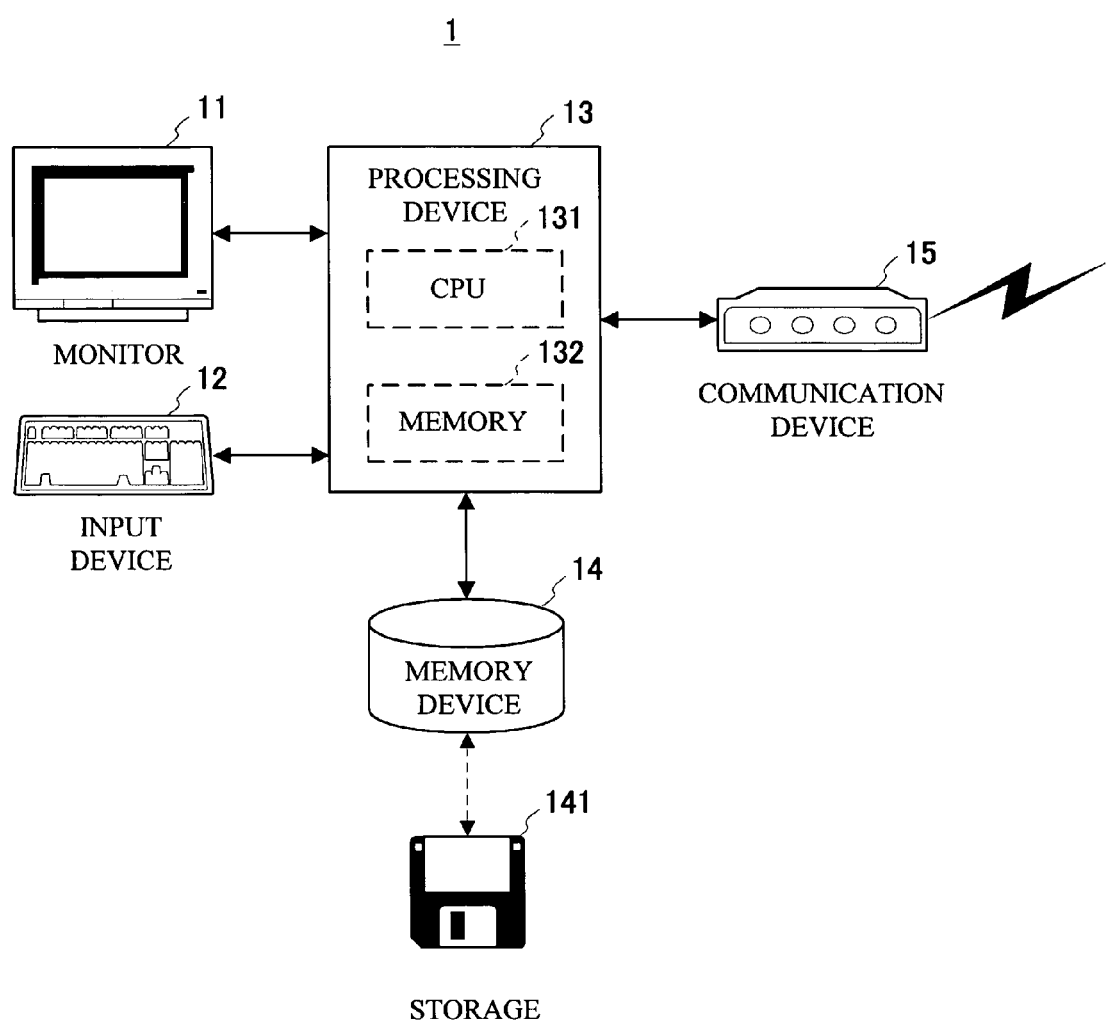
FIG. 1 is a view showing a configuration of a multitasking supporting apparatus 1.

A description will now be given, with reference to the accompanying drawings, of embodiments of the present invention. FIG. 1 is a view showing a configuration of a multitasking supporting apparatus 1. As shown in FIG. 1, the multitasking supporting apparatus 1 is a general-purpose computer terminal, and is composed of a monitor 11 such as an LCD display device or CRT (Cathode Ray Tube) display device, an input device 12 such as a keyboard and pointing device, a processing device 13 including a CPU (Central Processing Unit) 131 and a memory 132, a memory device 14 such as a HDD (hard Disk Drive) and CD (Compact Disc), and a communication device 15.

The multitasking supporting apparatus 1 is particularly suitable for use in processing multiplex operations while an operator is attending a remote conference at his or her own desk. The multitasking supporting apparatus 1 may be used as a stand-alone computer. However, according to the present embodiment, the multitasking supporting apparatus 1 is configured to connect another work environment of another operator via the communication device 15. Here, the aforementioned another work environment of another operator includes both an individual work environment and multiple work environments in which multiple operators get together to attend a meeting. The windows are displayed and used for multiple operations on the monitor 11, and a single CPU or multiple CPUs may control the respective operation windows.

In order to process the operations effectively within a limited period of time, it is efficient to execute tasks (operations) that can be processed in parallel from a macro perspective (hereinafter, referred to as multitasking, and the operation form of multitasking is referred to as multiplexed operation or multiplexed work). The aforementioned multitasking or multiplexed operation is already implemented in the actual operation. For example, the operator is reading a document on a mobile PC or replying to a received e-mail, while attending the conference. In this case, the operator simultaneously performs two different operations, which the operator has determined that the parallel operation would be possible. However, the operations are just a combination of limited operations, and the operations are not always combined in an appropriate manner.

The tasks performed in parallel in a certain period contribute to improvement of productivity. However, an appropriate combination of the tasks to be multiplexed has to be shown to carry out the tasks in parallel. Unless the combination of the tasks to be multiplexed is appropriately selected, this will cause confusion contrary to expectation.

The multitasking supporting apparatus 1 of the present invention determines whether the task can be multiplexed (possibility of multiplexing) according to the characteristics of the task, with respect to the registered multiple tasks. The multitasking supporting apparatus 1 provides an appropriate combination of tasks to the user, and supports an efficient accomplishment of multiple operations. Moreover, the multitasking supporting apparatus 1 of the present invention grasps the progresses of the tasks, and shows the information on the tasks that can be multiplexed on a display screen for displaying the tasks. This allows the user to start the multiple operations without concerning about the multitasking, enabling an efficient task process.

The multitasking supporting apparatus 1 of the present invention is configured to show several potential operations from among the registered unprocessed operations, at the time of attending a remote conference in particular, in view of a degree of how much the operator uses his or her thinking according to the conference content, a degree of importance or priority of the conference, a degree of participation (interest and responsibility), and a degree of recognition of the conference content.

Figure 2:
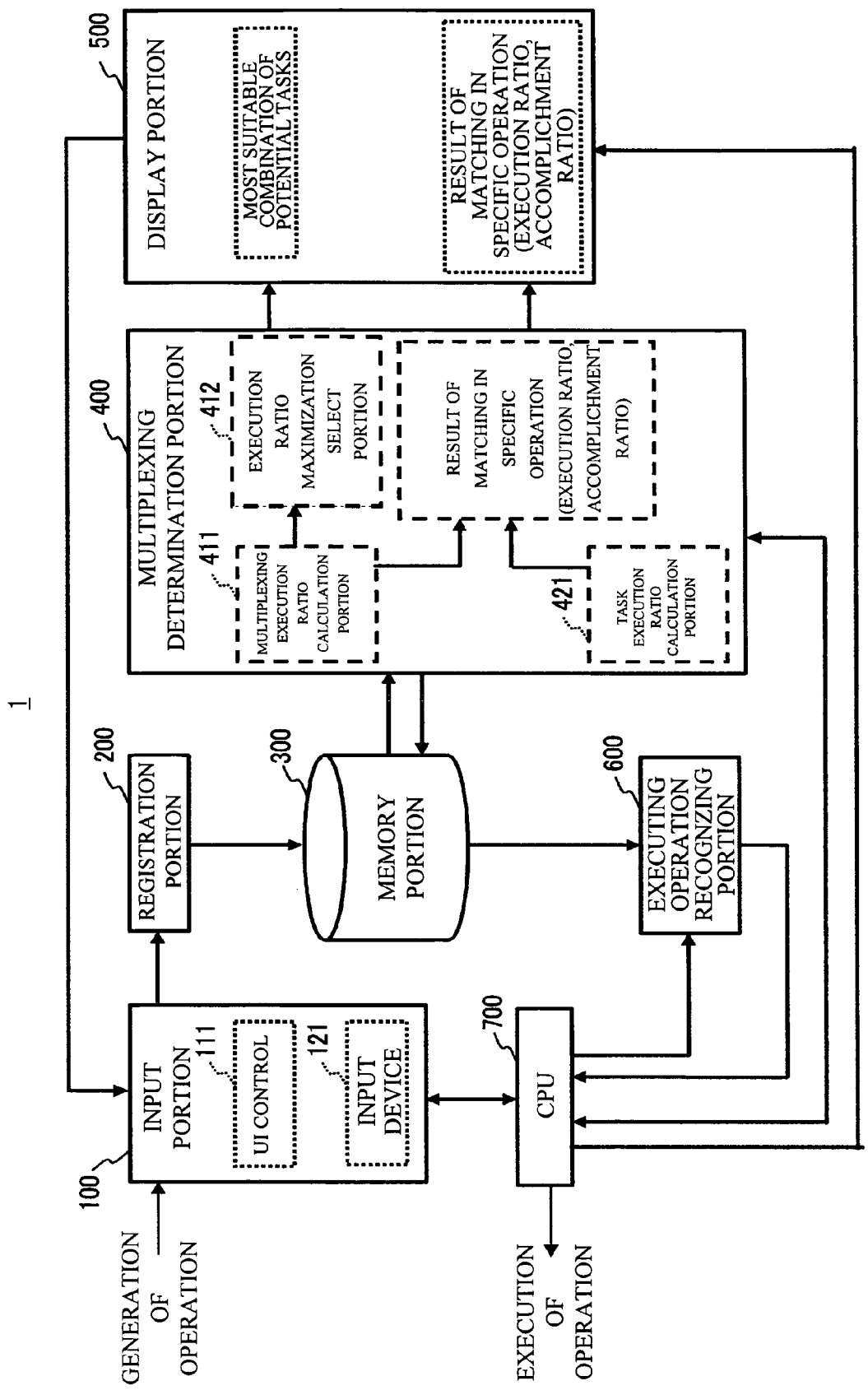
FIG. 2 is a view showing a functional block diagram of the multitasking supporting apparatus 1.

A description will now be given of capabilities of the multitasking supporting apparatus 1 of the present invention, with reference to FIG. 2. As shown in FIG. 2, the multitasking supporting apparatus 1 includes an input portion 100, a registration portion 200, a memory portion 300, a multiplexing determination portion 400, a display portion 500, an executing operation recognizing portion 600, and a CPU 700.

The input portion 100 is composed of a UI (User Interface) control portion 111 and an input device 121. The UI control portion 111 controls the input device 121 to receive input information that instructs a new registration of a task or editing of an already registered task, and outputs the input information to the registration portion 200. Here, editing the tasks includes a specify process of the task, a delete process of the task, and a select process of a task combination.

The UI control portion 111 controls the display portion 500 by way of the CPU 700, and displays a multitask supporting screen. The multitask supporting screen displays a task registration window that receives the task registration, a task display window that displays the registered task, and windows for a period for multiplexing, a multiplexing execution ratio, a task execution ratio, a multiplexing determination result, and a task combination selection.

The registration portion 200 newly registers the task or edits the task such as specify, change, and delete, according to the input information input from the input portion 100. Specifically, the registration portion 200 writes a new task into the memory portion 300 according to the input information. When the combination of the tasks is selected by the user via the input portion 100, the registration portion 200 specifies the information on the combination of multiple tasks stored in the memory portion 300. The memory portion 300 stores the combination of the operations determined by the multiplexing determination portion 400.

FIG. 3 is a view showing task characteristics. When an operation is created, the user inputs a task name and characteristics thereof with the input portion 100. Here, the task characteristics include, for example, a task type (a time-constraint type in which the user is constrained by time until the completion of the task regardless of the user's intention or a unit group type in which the operation can be finished according to the user's intention), an operation form (input into brain, bi-directional, or output from brain), an operation mode (sole, 1–1, 1–n, or n–n), an attitude (passive or active), task continuousness (continuation or intermittence), partitivity (possible or impossible), an operation type (thinking or doing), a used organ (eyesight, auditory sense, both, or hand), a task implementation mode (directly getting together or remote conference), a man-hour required for task, task importance (high, middle, or low), and participation expectation (priority). Here, the task characteristics are not limited to the aforementioned items, and a person who registers the task may change as necessary.

Also, with respect to the task type, a frequency of concentrating the consciousness on the operation in the period of processing the operation (hereinafter, referred to as TAI, task attention interval) is also registered as one of the characteristics of the time-constraint type. An estimated period necessary for completing a unit of operation (hereinafter, referred to as UAT, unit accomplishment time) and a total of the unit operations (hereinafter, referred to as UN, unit number) are also registered as the characteristics of the unit group type.

Specifically, the operation of the time-constraint type, in which the user is constrained by time until the completion of the task regardless of the user's intention, includes research report, business trip report, monthly or weekly report, technology investigation, strategy investigation, patent investigation, planning investigation, system change briefing, and lecture meeting. In addition, business negotiation, health and career consultation, rating interview, inquiry, and telephone are also categorized into the operation of the time-constraint type. However, the operation of the time-constraint type is not limited to above-mentioned items.

In the same manner, the operation of the unit group type, in which the operation can be finished according to the user's intention, includes patent drafting, report writing, briefing material creation, planning for solution, business planning, software installation, virus prevention, simulation, table data input, retrieval for patent, document, and material, understand material content, patent abstract creation, evaluation of patent content and conflict investigation, mail reception, mail creation and reply, WBT (e-learning), process of application, inventory control, and material order placement. However, the operation of the unit group type is not limited to above-mentioned items.

The task attention interval (TAI) represents a degree of concentration of attention in the operation of the time-constraint type. The inventors of the present invention have found out that the implementation of multiple tasks is a distribution of concentration (attention or thinking) on the tasks, as a result of studies on the basis of reality of multiple works that have already been implemented. Therefore, with respect to the operation of the time-constraint type, it is relatively difficult to process multiple operations when the attention is highly concentrated on one operation, and it is relatively easy to process multiple operations when the concentration of attention is low. This concentration of attention varies depending on the operator's recognition, importance, and a degree of participation on the operation of the time-constraint type, and in addition, the concentration of attention in each specific period of time in the whole operation period varies depending on the program or content (agenda of the conference) corresponding to the aforementioned each specific period of time. This is the reason why the concentration of attention has to be specified according to the aforementioned each specific period of time included in the whole operation period.

The task attention interval (TAI) is used as a value of the characteristics representing the concentration of attention on the operation. The high concentration means that a time period is short while the operator is processing the operation intermittently. The shortest time period is "0" in TAI, and this means that the operator continues working on the operation of the time-constraint type; in other words, the operator cannot process the unit group type. Additionally, when the concentration becomes lower, it can be thought that the responsibility of involvement in the operation is decreased, the immediate progress of the operation can be predicted to some extent, and the operation is sufficiently understood. In the cases mentioned above, the period for concentrating on the operation becomes longer. In fact, at the time of conference, when the concentration is not required, there is no problem in some cases, even if the period for concentrating on the operation accordingly becomes longer. This is the reason why the concentration of attention on the operation of the time-constraint type can be specified by the period.

For example, on a conference, if the task attention interval (TAI) is 5, it is sufficient to listen to the content of the conference once for every five minutes. This case corresponds to a conference case in which an operator attends a conference as one of multiple reporters and other participants are making reports on the agenda not related to the operator directly. This also corresponds to a case where the operator is waiting for a next key input in the software installation or simulation of large-scaled software.

In contrast, if the task attention interval (TAI) is 0.5, the operator has to concentrate on the operation of the time-constraint type once for every thirty seconds. This corresponds to a conference case in which remarks of the reporter is unknown information and should not be missed such as the presentation of an academic conference, the report of the investigation, or discussion, or opinions have to be exchanged with respect to the remarks.

The period of the concentration of attention in one operation is not specified, here. Technically, even if the attention is concentrated once for every five minutes, the concentration may continue for ten minutes. However, in this case, the aforementioned 10 minutes is set as another task attention interval (TAI) having the value of 0. Accordingly, it is preferable that as much as TAI/10 or several seconds should be set as a rough standard of one operation period, and the task attention interval (TAI) should be set for each operation period so that a critical problem may not arise in an absolute value of the multiplexing execution ratio, as will be described later.

Figures 4A, 4B:
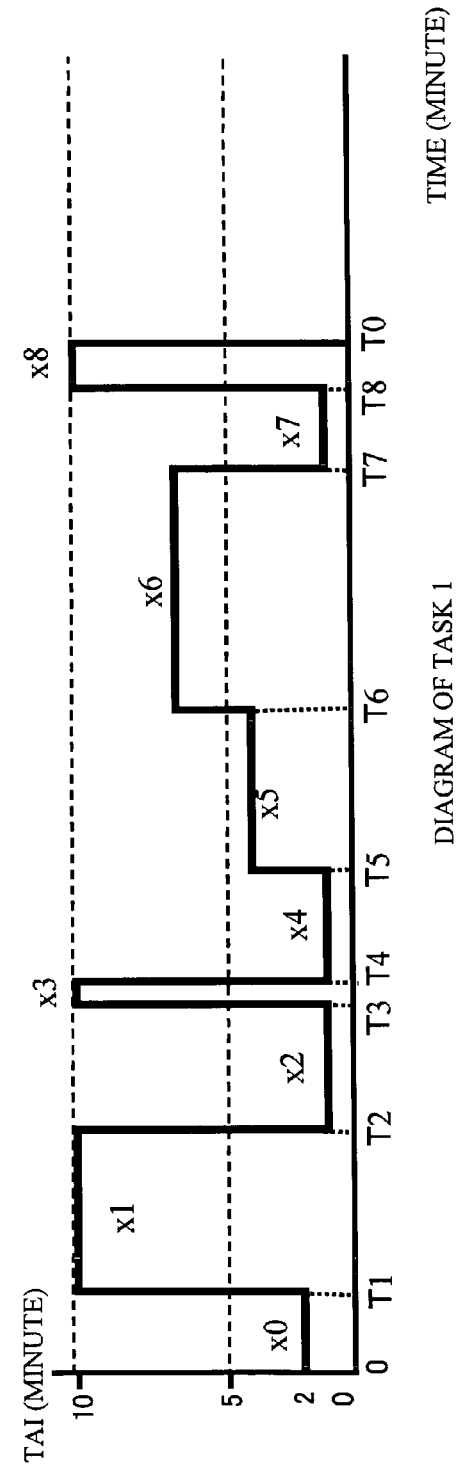
FIG. 4A shows values of the task attention interval (TAI) varying in the whole operation period in an operation of time-constraint type 1 and elapsed times.
FIG. 4B is a diagram of FIG. 4A.

FIG. 4A shows values of the task attention interval (TAI) varying in the whole operation period in an operation of time-constraint type 1 and elapsed times. FIG. 4B is a diagram of FIG. 4A. Data, set as the task attention interval (TAI) with respect to the task of the time-constraint type, is stored in the memory portion 300 in a format shown in FIG. 4A. The table shown in FIG. 4A is a subsidiary table of the table shown in FIG. 3. Referring to FIG. 4B, the task attention interval (TAI) varies depending on the time, and the TAI value continues until the TAI changes next time. In other words, TAI is ×0 in a period 0 to T1, TAI is ×1 in a period T1 to T2, and TAI is ×2 in a period T2 to T3. Here, the TAI values are registered from the input portion 100 in advance, in consideration of the program in progress of the operation and the operator's attention and knowledge of the operation. Here, the more appropriate task attention interval (TAI) values are set, the more appropriate information on the multiplexing can be offered.

Figures 5A, 5B:
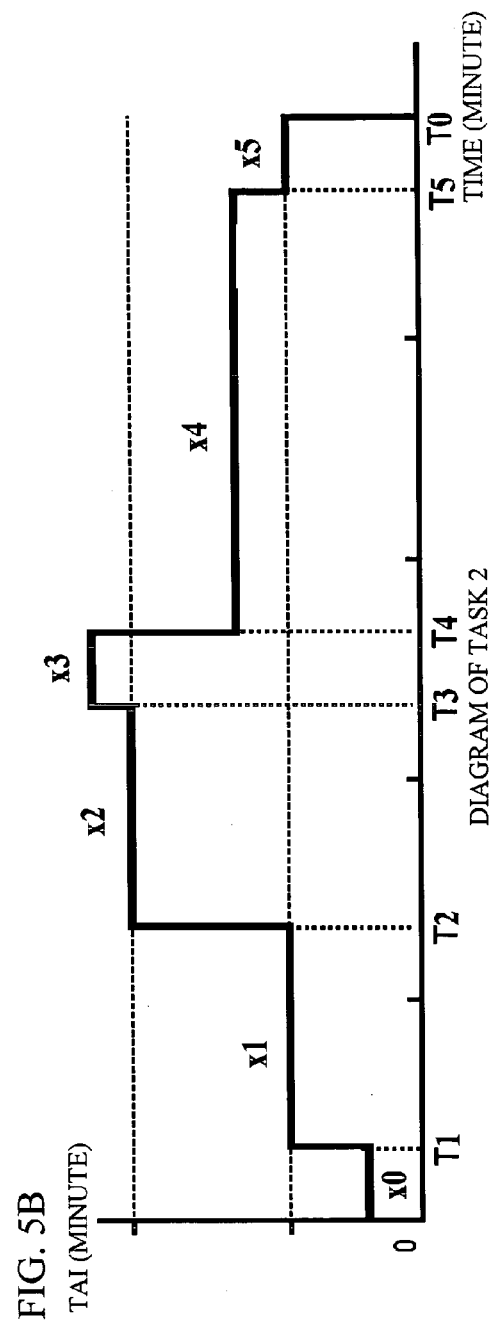
FIG. 5A shows values of the task attention interval (TAI) varying in the whole operation period in an operation of time-constraint type 2 and elapsed times.
FIG. 5B is a diagram of FIG. 5A.

FIG. 5A shows values of the task attention interval (TAI) varying in the whole operation period in an operation of time-constraint type 2 and elapsed times. FIG. 5B is a diagram of FIG. 5A.

Next, the unit accomplishment time (UAT) denotes a rough time necessary for processing one unit of the operation of the unit group type. The inventors of the present invention have found out that when the attention (thinking) is released from the operation of the time-constraint type in the actual multitask implementation and is then concentrated on the operation of the unit group type, the tasks are multiplexed, as a result of studies on the basis of actual multitask implementation. If the attention (thinking) concentrating on the operation of the unit group type is interrupted before finishing one unit, it becomes obvious that an extra time is necessary for remembering the interrupted unit again to complete the unit and a more time is required than completing the operation without an interruption. If the aforementioned case happens, the efficiency will be degraded in multiplexing the operation of the unit group type. Hence, it is preferable that at least one unit should be processed without an interruption, when the operation of the unit group type is carried out. The unit accomplishment time (UAT) specifies the characteristics of the period for continuingly processing the operation.

The unit number (UN) represents the number of units that composes the operation of the unit group type. The value of the unit number (UN) varies depending on the operation of the unit group type. Basically, the unit number (UN) represents a repeated number of a similar process. Therefore, one input is considered to be one unit, in inputting the data into the table or form of the spreadsheet software. If there are 500 data to be input, the unit number (UN) is set to 500. In this case, if the unit accomplishment time (UAT) is, for example, 0.05 minute (3 seconds), the operation period will be 25 minutes, which is obtained by the unit number (UN) multiplied by the unit accomplishment time (UAT).

On the other hand, the operation like the patent abstract creation has the unit number (UN) equal to the number of patents to be created. Here, the unit accomplishment time (UAT) is set to approximately 5 to 10 minutes, for example, and the number of unit (UN) is 50, the operation period will be 250 to 500 minutes (about 4 to 8 hours). Also, in the operation of extracting the related patents, if there are 200 patents to be extracted, the unit number (UN) is 200, and the unit accomplishment time (UAT) is set to 0.2 minutes (12 seconds), although this varies depending on the criterion of judgment, the operation period in this case will be 40 minutes.

Same as the mail processing, if the number of the mail to be processed is 50, the unit number (UN) is 50. If it takes 6 seconds to process each e-mail and the unit accomplishment time (UAT) is 0.1 minute, the operation period will be 5 minutes. With respect to the operation such as the patent drafting or report writing, the similar operations are not repeated even if the operation items are segmented. Hence, the unit number (UN) is set to 1 and the unit accomplishment time (UAT) is 30 to 60 minutes, the operation period will be 30 to 60 minutes.

The above-mentioned information is retained in the memory portion 300 as shown in FIG. 6. FIG. 6 shows a table of characteristics of tasks A and B of the unit group types. This table is a subsidiary table of that shown in FIG. 3. The task characteristics of the unit group type include the unit accomplishment time (UAT), the unit number (UN), and the whole operation period. For example, with respect to the task A of the unit group type, if the unit accomplishment time (UAT) is yA and the unit number (UN) is zA, the whole operation period is yA×zA. The unit accomplishment time (UAT) is set in consideration of the program in progress of the operation and the operator's attention and knowledge of the operation, and is registered in advance with the input portion 100.

The memory portion 300 retains the input information applied from the registration portion 200, extracts the input information as requested, and provides the input information. The memory portion 300 of the present invention manages the input information as a relational database; however, the input information is not limited to the afore-mentioned database.

Main items managed in the memory portion 300 are information on the characteristics of the registered tasks with respect to respective combinations of the tasks, a period used for multiplexing that has been calculated by the multiplexing determination portion 400, the multiplexing execution ratio, the task execution ratio, sums thereof by the task combination, priority information on the task combinations and efficient combinations. However, the main items are not limited to the above-mentioned ones.

Next, the multiplexing determination portion 400 is configured to determine the appropriateness of the operation on the basis of the characteristics of the operation to be multiplexed. The multiplexing determination portion 400 includes a multiplexing execution ratio calculation portion 411 and a task execution ratio calculation portion 421. The multiplexing execution ratio calculation portion 411 calculates the a period and ratio in which multiple operations are executed simultaneously and sums thereof, on the basis of the characteristics of the operations to be multiplexed. The task execution ratio calculation portion 421 calculates the execution ratio of the operation that can be executed from the user's decision and the sum of the ratios at the time of executing multiple operations simultaneously. The multiplexing determination portion 400 determines the appropriateness of multiple operations to be multiplexed by combining the task of the time-constraint type and that of the unit group type.

In addition, the multiplexing determination portion 400 determines the appropriateness of multiplexing multiple operations by combining the sum of the periods in which multiple operations are processed simultaneously, the sum of the ratios in which multiple operations are processed simultaneously, and the sum of the execution ratios of the operations that can be executed from the user's decision at the time of executing multiple operations simultaneously, on the basis of the characteristics of the operations to be multiplexed. In addition, the multiplexing determination portion 400 may determine the appropriateness of the operations selected from among multiple operations. Further, the multiplexing determination portion 400 may evaluate the registered contents of unprocessed operations retained in the memory portion 300 and assign the characteristics necessary for the judgment of multiplexing. The result of matching in the characteristic operation (execution ratio, accomplishment ratio) is output from the multiplexing determination portion 400 or the memory portion 300 to the display portion 500. Hereinafter, a description will be given of the multiplexing execution ratio calculation portion 411, the task execution ratio calculation portion 421, and an execution ratio maximization select portion 412.

The multiplexing execution ratio calculation portion 411 has a function of calculating a multiplex execution ratio (MR) The multiplex execution ratio (MR) denotes a ratio of processing multiple operations simultaneously, and is represented by TA(1)/T0(1), where T0(1) denotes a period to complete a task 1, and TA(1) denotes another period to execute another task A. Here, while the aforementioned another task A is being executed, the task 1 has two cases, namely, the task 1 stops or is in progress. The present invention is applicable to both two cases, yet in particular; it is considered that the operations can be multiplexed while the task 1 is in progress.

The operation of the time-constraint type corresponding to the task 1 is particularly and desirably applicable to the conference from among the examples mentioned above. Here, the period TA(1) to process the aforementioned another task A, while the task A being processed in the period T0(1) to complete the task 1, is calculated with the relationship between the task attention interval (TAI) and the unit accomplishment time (UAT).

Figures 7A, 7B:
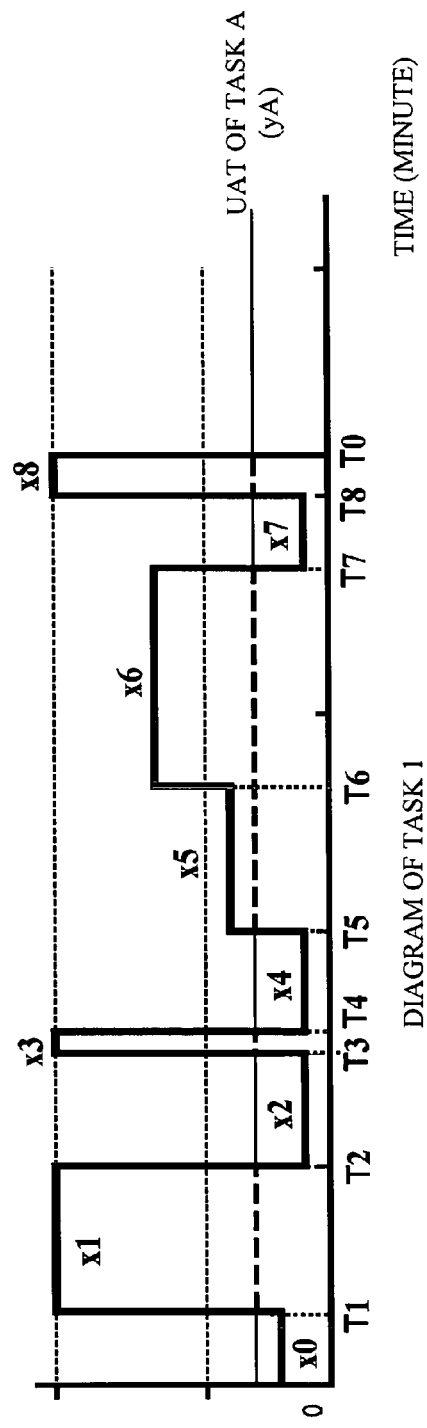
FIG. 7A is a table for determining to multiplex the task 1 and the task A.
FIG. 7B is a diagram schematically showing the task 1 and the task A to be multiplexed.

FIGS. 7A and 7B show relationship between the task 1 of the time-constraint type and the task A of the unit group type. FIG. 7A is a table for determining the task 1 and the task A to be multiplexed. FIG. 7B is a diagram schematically showing the task 1 and the task A to be multiplexed. In FIGS. 7A and 7B, first, the task attention interval (TAI)>the unit accomplishment time (UAT) has to be satisfied so that the task A of the unit group type may be processed while the task 1 of the time-constraint type is being processed without an interruption. That is to say, the unit accomplishment time (UAT) is necessary for processing one of the units included in the task A of the unit group type, however, the smooth processing of the unit needs a continuous thinking.

If an interruption in thinking occurs while the unit is being processed, an extra time is required for returning to thinking to restart processing the unit. This requires more time than continuously processing the unit. If this happens, the efficiency of the task A of the unit group type is degraded by multiplexing. This is the reason why it is desirable that at least one unit has to be processed continuously to process the task A of the unit group type.

With respect to the task 1 of the time-constraint type, the period defined by the task attention interval (TAI) represents the period of distributed thinking necessary for implementing the process of the task 1 of the time-constraint type. This means that once for how many minutes the thinking is devoted to the conference in order to understand the progress of the agenda while attending the conference, for example. This varies depending on the level of the operator's prior knowledge about the content of the conference and also varies depending on the item of the conference. The task attention interval (TAI) is registered in advance by the operator by the period. However, if one unit of the task A of the unit group type can be processed in a shorter period of time than the period of distributed thinking, namely, the task attention interval (TAI), the efficiency in processing the task A of the unit group type will not be degraded.

Accordingly, the condition of the task attention interval (TAI)>the unit accomplishment time (UAT) has to be satisfied so that the task A of the unit group type may be executed while the task 1 of the time-constraint type is in progress. In FIG. 7, there are four periods that satisfy the aforementioned condition in the whole conference period. There are t1, t2, t3, and t4. Here, t1=T2−T1, t2=T4−T3, t3=T7−T5, and t4=T0−T8.

Then, as a second condition, the periods tx (x=1 to 4) has to be longer than the period necessary for processing one unit of the task B of the unit group type. This is shown as tx>UAT. In FIGS. 7A and 7B, tx that satisfies the second condition includes t1, t2, t3, and t4. Therefore, a period used for multiplexing TA(1)=Σtx (TAI>UAT and tx>UAT) is represented by TA(1)=t1+t2+t3+t4. A multiplexing execution ratio MRA (1)=TA(1)/T0(1)=(t1+t2+t3+t4)/T0. The calculation process of the aforementioned multiplexing execution ratio (MR) is performed on the combination selected by the operator or all the registered combinations of the operations of the time-constraint type and the operation of the unit group type.

FIGS. 8A and 8B are views for determining to multiplex the tasks A and B of the unit group type and the task 1 of the time-constraint type. FIG. 8A is a diagram schematically showing the task 1 and the tasks A and B to be multiplexed. FIG. 8B is a table for determining to multiplex the tasks A and B and the task 1. In FIG. 8B, the task attention interval (TAI) of the task 1 of the time-constraint type is shown on the left, the determination of multiplexing the task 1 of the time-constraint type and the task A of the unit group type is shown in the center, and the determination of multiplexing the task 1 of the time-constraint type and the task B of the unit group type is shown on the right.

The multiplexing execution ratio calculation portion 411 determines that the task 1 of the time-constraint type and the task A of the unit group type satisfies the task attention interval (TAI)>the unit accomplishment time (UAT). Then, the multiplexing execution ratio calculation portion 411 determines whether the period tx is longer than the period necessary for processing one unit of the task A of the unit group type, namely, tx>UAT, as the second condition, with respect to the task 1 of the time-constraint type and the task A of the unit group type. In FIGS. 8A and 8B, the period tx that satisfies the condition includes t1, t2, t3, and t4. Accordingly, the period used for multiplexing TA(1)=Σtx (TAI>UAT and tx>UAT) is represented by TA(1)=t1+t2+t3+t4.

The multiplexing execution ratio calculation portion 411 determines whether the task 1 of the time-constraint type and the task B of the unit group type satisfy the condition of the task attention interval (TAI)>the unit accomplishment time (UAT). Then, the multiplexing execution ratio calculation portion 411 determines whether the period tx is longer than the period necessary for processing one unit of the task B of the unit group type, namely, tx>UAT, as the second condition, with respect to the task 1 of the time-constraint type and the task B of the unit group type. In FIGS. 8A and 8B, the period tx that satisfies the condition includes t11, t12, and t13. Here, t11=T2−T1, t12=T7−T6, and t13=T0−T8. Accordingly, a period for multiplexing TB(1)=Σtx (TAI>UAT and tx>UAT) is represented by TB(1)=t11+t12+t13.

Figure 9B:
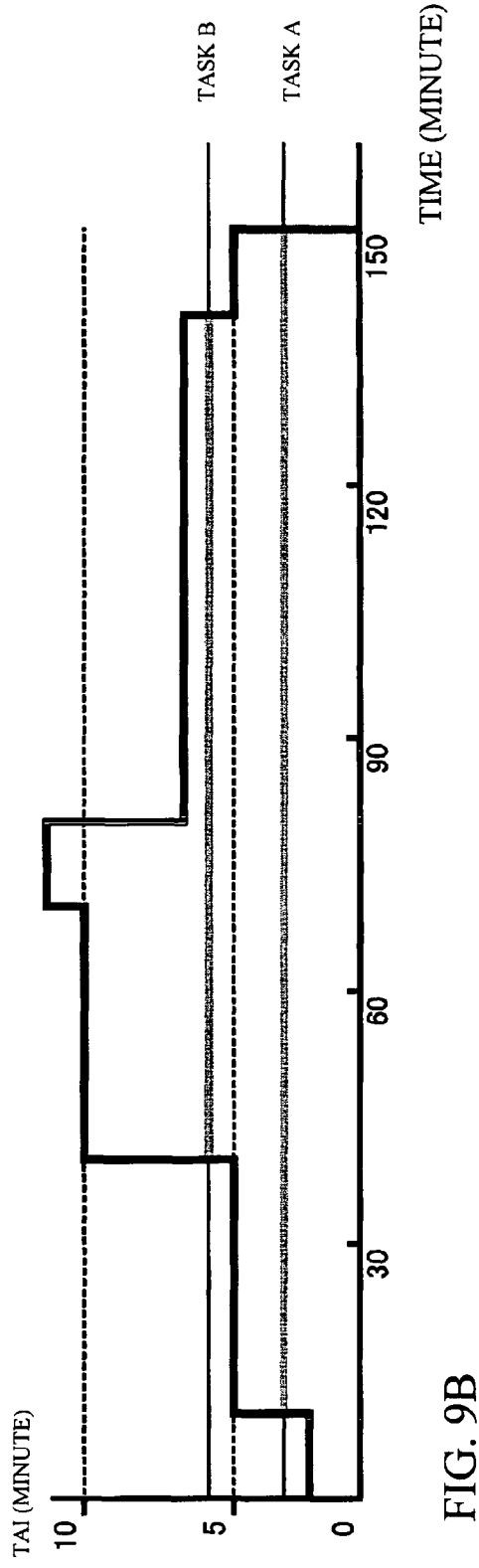
FIG. 9B is a table for determining the tasks A and B and the task 2 to be multiplexed.

FIGS. 9A and 9B are views for determining to multiplex the tasks A and B of the unit group type and a task 2 of the time-constraint type. FIG. 9A is a diagram schematically showing the task 2 and the tasks A and B to be multiplexed. FIG. 9B is a table for determining to multiplex the tasks A and B and the task 2. In FIG. 9B, the task attention interval (TAI) of the task 2 of the time-constraint type is shown on the left, the determination of multiplexing the task 2 of the time-constraint type and the task A of the unit group type is shown in the center, and the determination of multiplexing the task 2 of the time-constraint type and the task B of the unit group type is shown on the right.

First, the multiplexing execution ratio calculation portion 411 determines whether the task 2 of the time-constraint type and the task A of the unit group type satisfy the condition of the task attention interval (TAI)>the unit accomplishment time (UAT). Then, the multiplexing execution ratio calculation portion 411 determines whether the period tx is longer than the period necessary for processing one unit of the task A of the unit group type, namely, tx>UAT, as the second condition, with respect to the task 2 of the time-constraint type and the task A of the unit group type. In FIGS. 9A and 9B, the period tx that satisfies the condition includes t21, t22, t23, t24, and t25. Here, t21=T2−T1, t22=T3−T2, t23=T4−T3, t24=T5−T4, and t25=T0−T5. Accordingly, a period used for multiplexing TA(2)=Σtx (TAI>UAT and tx>UAT) is represented by TA(2)=t21+t22+t23+t24+t25.

The multiplexing execution ratio calculation portion 411 determines whether the task 2 of the time-constraint type and the task B of the unit group type satisfies the condition of the task attention interval (TAI)>the unit accomplishment time (UAT). Then, the multiplexing execution ratio calculation portion 411 determines whether the period tx is longer than the period necessary for processing one unit of the task B of the unit group type, namely, tx>UAT, as the second condition, with respect to the task 2 of the time-constraint type and the task B of the unit group type. In FIGS. 9A and 9B, the period tx that satisfies the condition includes t22, t23, and t24. Accordingly, a period used for multiplexing TB(2)=Σtx (TAI>UAT and tx>UAT) is represented by TB(2)=t22+t23+t24.

Then, the execution ratio maximization select portion 412 selects a combination having a maximum sum of the multiplexing execution ratios (MR) from among multiple combinations of the registered tasks, in which the tasks are not overlapped, on the basis of the calculation of the above-described multiplexing execution ratio (MR). Specifically, assuming that the task attention interval (TAI) of the two tasks 1 and 2 of the time-constraint type are registered as shown in FIGS. 4A through 5B, and the unit accomplishment time (UAT) of the two tasks of the unit group type are registered as shown in FIG. 6.

FIGS. 10A through 10D and FIGS. 11A and 11B are tables showing results determined by the FIG. 8A through FIG. 9B, with respect to all the combinations. FIG. 10A is a table showing the periods used for multiplexing all combinations of the tasks. FIG. 10B is a table showing the multiplexing execution ratios of all combinations of the tasks. FIG. 10C is a table showing the periods used for multiplexing the potential tasks to be multiplexed and sums of the multiplexing execution ratios. FIG. 10D is a table showing priorities of the periods used for multiplexing the potential tasks to be multiplexed, the periods thereof, and the multiplexing execution ratios thereof.

The multiplexing execution ratio calculation portion 411 calculates the periods used for multiplexing the tasks 1 and 2 of the time-constraint type and the tasks A and B of the unit group type, as shown in 10A. Here, TA(1) denotes the period used for multiplexing the task 1 of the time-constraint type and the task A of the unit group type. TB(1) denotes the period used for multiplexing the task 1 of the time-constraint type and the task B of the unit group type. TA(2) denotes the period used for multiplexing the task 2 of the time-constraint type and the task A of the unit group type. TB(2) denotes the period used for multiplexing the task 2 of the time-constraint type and the task B of the unit group type.

The multiplexing execution ratio calculation portion 411 calculates the multiplexing execution ratio (MR), on the basis of the period used for multiplexing, as shown in FIG. 10B. The execution ratio maximization select portion 412 calculates the sums of the periods used for multiplexing and the sums of the multiplexing execution ratios, and extracts the potential tasks for the combination of the tasks to be multiplexed, as shown in FIG. 10C. The execution ratio maximization select portion 412 determines the priorities of the combinations of the efficient operations with reference to the sums of the periods used for multiplexing and those of the multiplexing execution ratios. This allows the user to select appropriate combination of the tasks. Moreover, it is possible to select the most efficient combination of the tasks at every point, in consideration of the characteristics of the respective tasks and whether the task can be performed depending on the situation, by providing the priority and value of the period used for multiplexing and those of the execution ratio.

On the multitasking supporting apparatus 1, the user is able to select what item should be a criterion. If a greater sum of the multiplexing execution ratio is considered a more efficiently combined operations to be multiplexed, the priorities of the efficient combinations of the operations are shown in FIG. 10D. Also, the task execution ratio may be used for judging the priorities of the efficient combinations of the operations.

Next, a description will be given of the task execution ratio calculation portion 421. The task execution ratio calculation portion 421 calculates a task execution ratio (TER) as the ratio of a task amount that has been processed during a multitask operation period in all the unit numbers included in the task of the unit group type (T/UAT). FIG. 11A is a table showing all the combinations of the task execution ratios (TER) of the tasks 1 and 2 of the time-constraint type and the tasks A and B of the unit group type. FIG. 11B is a table showing the priorities of the combinations of the potential tasks to be multiplexed and the sums of the task execution ratios thereof. Specifically, the task execution ratio (TER)=T/(UAT×UN).

As shown in FIG. 11B, the task execution ratio (TER) is provided for the operator as a referential index to select the most suitable combination of the tasks to be multiplexed. Basically, the combination having the sum of the longest period used for multiplexing is considered the most efficient works to be multiplexed. However, if the importance or urgency is set high as the characters of the operation of the unit group type, this is provided for the operator as reference information for selecting the operation of the unit group type having a high execution ratio rather than the efficiency of multiplexing.

The display portion 500 displays a multitask supporting screen, which is instructed from the UI control portion 111 through the CPU 700. The multitask supporting screen displays windows for application software that executes the works to be multiplexed such as spreadsheet software, word-processing software, remote conferencing software, and the like, a task registration window that receives the task registration, a task display window that displays the registered task, and other windows that display the period used for multiplexing, the multiplexing execution ratio, the task execution ratio, the period used for multiplexing, the sum of the periods used for multiplexing and the sum of the task execution ratios, the determination result of multiplexing, and the selection of the task combination. The user is able to select the combination of given operations from among the combinations of multiple operations determined by the multiplexing determination portion 400, with the input portion 100.

The executing operation recognizing portion 600 recognizes the operations that are being processed from among the combination of the operations determined by the multiplexing determination portion 400. More specifically, the executing operation recognizing portion 600 detects a progress status of the task registered in the database in the memory portion 300, and instructs the CPU 700 to reflect the progress status of the task that has been detected in the activation of the application or display on the window necessary for the task to be multiplexed. To be more precise, the executing operation recognizing portion 600 estimates the progress status of the task with the data of executed date and time included in the registered content of the task of the time-constraint type. In addition, the executing operation recognizing portion 600 detects the progress status of the registered task by detecting the activation of the application software necessary for the process of the task, with respect to the task of the time-constraint type and that of the unit group type.

The CPU 700 controls the input operation such as the task registration or combination selection, the activation of the application or window display necessary for the task execution, and the execution of the multiplexing determination process. The CPU 700 is configured to execute the process related to the operation recognized by the executing operation recognizing portion 600. For example, the CPU 700 controls the application corresponding to the operation recognized by the executing operation recognizing portion 600 to activate automatically.

Figure 12:
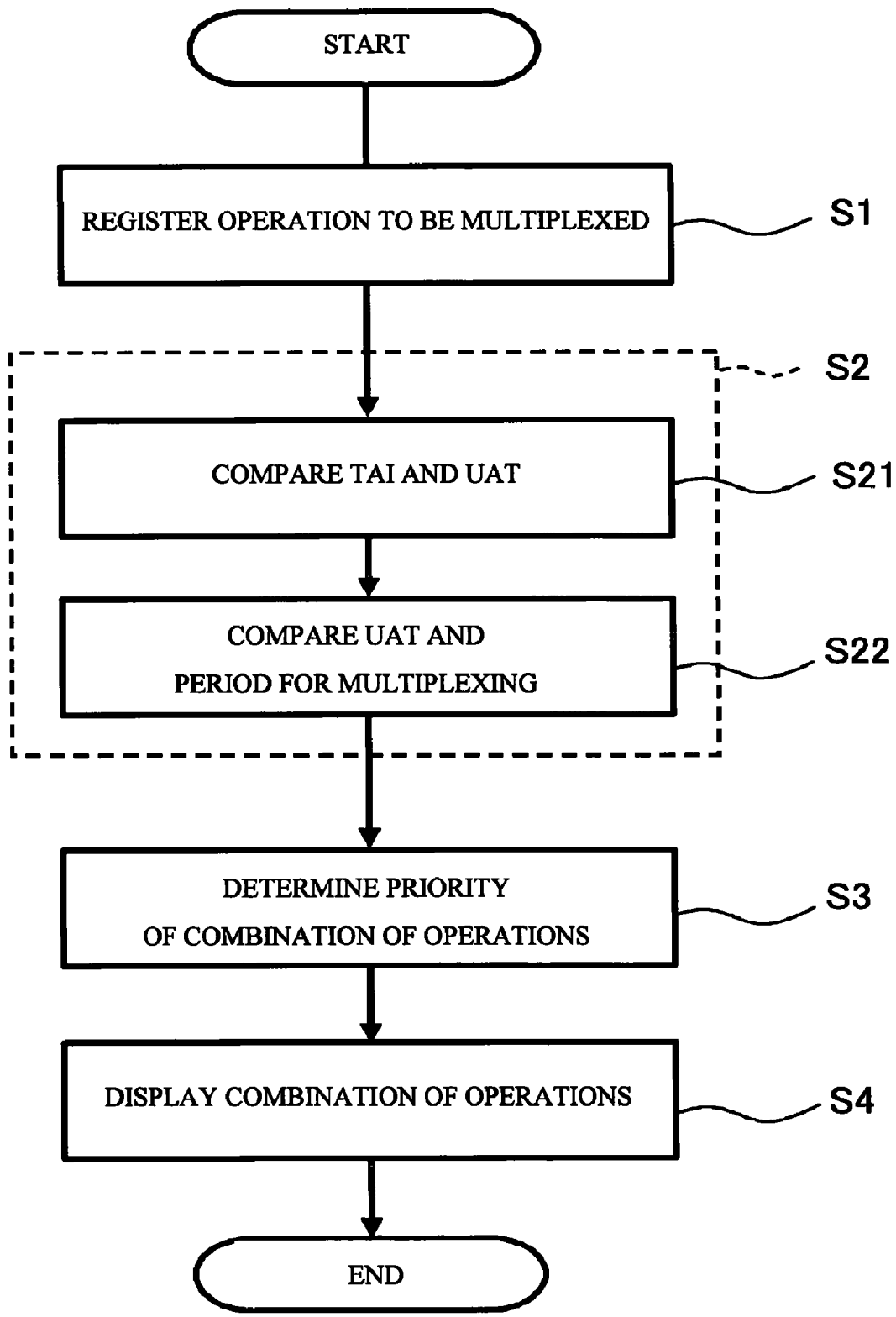
FIG. 12 is a flowchart showing a process of the multitasking supporting apparatus 1.

Next, a description will be given of the operation of the multitasking supporting apparatus 1. FIG. 12 is a flowchart showing the process of the multitasking supporting apparatus 1. When the user inputs the characteristics of the operation to be multiplexed from the input portion 100 in step S1, the registration portion 200 registers the characteristics of the operation to be multiplexed in the memory portion 300.

The multiplexing determination portion 400 determines the appropriateness for multiplexing the operations on the basis of the characteristics of the operation to be multiplexed in step S2. Specifically, the multiplexing determination portion 400 determines the appropriateness for multiplexing the operations with reference to a comparison (greater or smaller) between the frequency of concentrating attention on the operation (TAI) and the estimated time for completing the unit operation (UAT) in the period of completing the operation, in step S21. The multiplexing determination portion 400 determines the appropriateness for multiplexing the operations with reference to the comparison of the estimated time for completing the unit operation (UAT) and the period used for multiplexing, in step S22.

The priority as to the efficient combination of the operations is determined in step S3. Specifically, in step S3, the multiplexing execution ratio calculation portion 411 calculates the sum of the periods in which multiple operations are simultaneously executed and the sum of the ratios in which multiple operations are simultaneously executed. The execution ratio maximization select portion 412 calculates the sum of the execution ratios of the operation that can be completed by the user's will while multiple operations are being processed simultaneously. The execution ratio maximization select portion 412 determines the priorities of the efficient combinations of the operations with the aforementioned sums. The display portion 500 displays the combination of the operations in step S4. It is therefore possible to process multiple operations in parallel more efficiently by determining the appropriateness for multiplexing multiple operations on the basis of the characteristics of the operations to be multiplexed.

A description will now be given in more detail with embodiments. However, the present invention is not limited to the embodiments described below.

First Embodiment

A description will be given of a case where three tasks of the time-constraint type (11, 22, and 33) and three tasks of the unit group type (AA, BB, and CC) are registered in the memory portion 300. FIG. 13A through FIG. 15B show the task attention intervals (TAI) of the tasks of the time-constraint type (11, 22, and 33). FIG. 16 shows the unit accomplishment times (UAT) of the tasks of the unit group type (AA, BB, and CC).

Figures 13A, 13B:
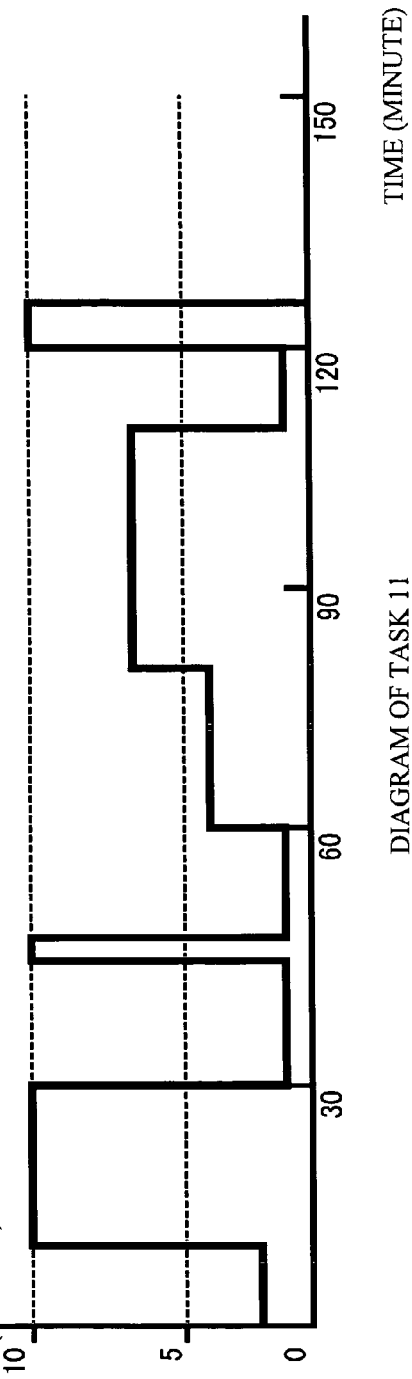
FIG. 13A is a table showing elapsed times and the task attention intervals (TAI) thereof when the TAI varies in the whole operation period of the task of the time-constraint type 11.
FIG. 13B is a diagram of the table shown in FIG. 13A.
Figures 14A, 14B:
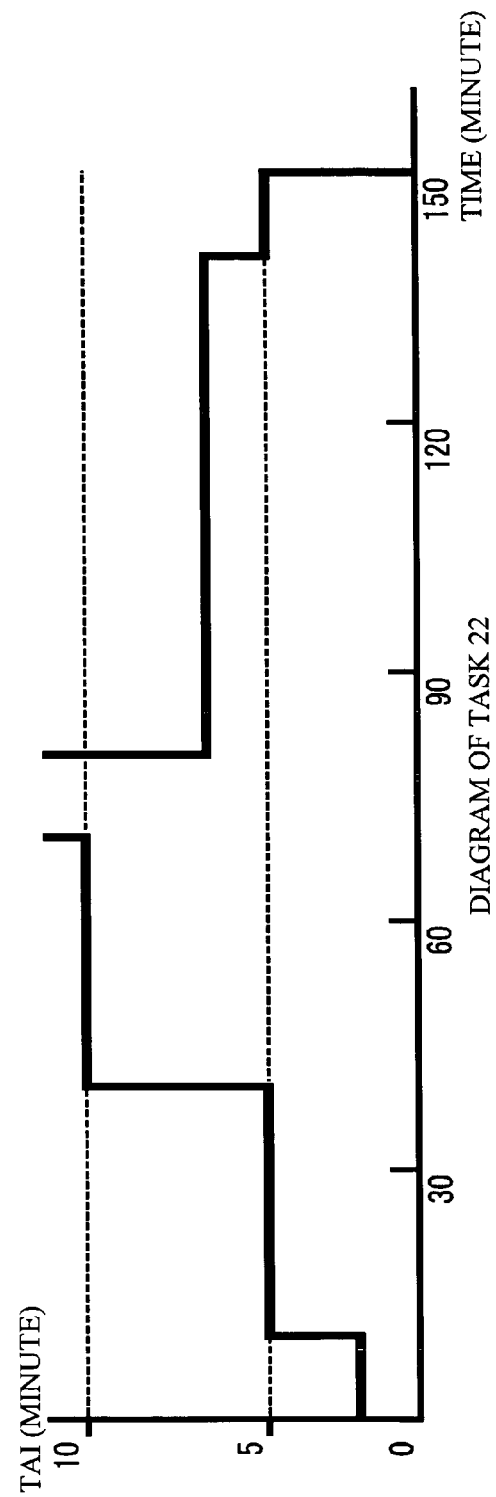
FIG. 14A is a table showing the elapsed times and the task attention intervals (TAI) thereof when the TAI varies in the whole operation period of the task of the time-constraint type 22.
FIG. 14B is a diagram of the table shown in FIG. 14A.
Figures 15A, 15B:
FIG. 15A is a table showing the elapsed times and the task attention intervals (TAI) thereof when the TAI varies in the whole operation period of the task of the time-constraint type 33.
FIG. 15B is a diagram of the table shown in FIG. 15A.

FIG. 13A is a table showing the elapsed time and the task attention intervals (TAI) thereof when the TAI varies in the whole operation period of the task of the time-constraint type 11. FIG. 13B is a diagram of the table shown in FIG. 13A. FIG. 14A is a table showing the elapsed times and the task attention intervals (TAI) thereof when the TAI varies in the whole operation period of the task of the time-constraint type 22. FIG. 14B is a diagram of the table shown in FIG. 14A. FIG. 15A is a table showing the elapsed times and the task attention intervals (TAI) thereof when the TAI varies in the whole operation period of the task of the time-constraint type 33. FIG. 15B is a diagram of the table shown in FIG. 15A.

FIG. 16 shows the characteristics of the unit accomplishment times (UAT) of the tasks of the unit group type (AA, BB, and CC). FIG. 17A through 19C show the UAT of the three tasks of the unit group type together with the diagrams of the TAI of the respective tasks of the time-constraint type in order to understand the relationship of multiplexing all the combinations of the tasks, on the basis of the registered data.

Figures 17A, 17B, 17C:
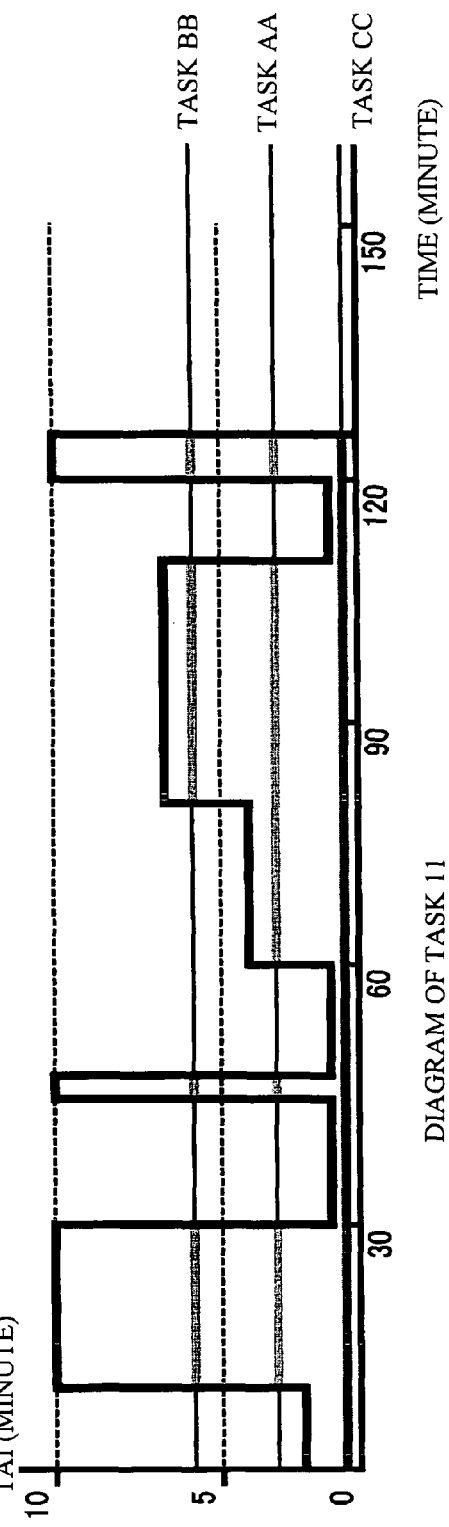
FIG. 17A is a table showing the elapsed time and the task attention intervals (TAI) thereof when the TAI varies in the whole operation period of the task of the time-constraint type 11.
FIG. 17B is a table showing the unit accomplishment times (UAT) and periods T used for multiplexing the three tasks of the unit group type.
FIG. 17C is a diagram of the tables shown in FIGS. 17A and 17B.

FIG. 17A is a table showing the elapsed time and the task attention intervals (TAI) thereof when the TAI varies in the whole operation period of the task of the time-constraint type 11. FIG. 17B is a table showing the unit accomplishment times (UAT) and periods T used for multiplexing the three tasks of the unit group type. FIG. 17C is a diagram of the tables shown in FIGS. 17A and 17B. FIG. 18A is a table showing the elapsed time and the task attention intervals (TAI) thereof when the TAI varies in the whole operation period of the task of the time-constraint type 22. FIG. 18B is a table showing the unit accomplishment times (UAT) and the periods T used for multiplexing the three tasks of the unit group type. FIG. 18C is a diagram of the tables shown in FIGS. 18A and 18B.

FIG. 19A is a table showing the elapsed time and the task attention intervals (TAI) thereof when the TAI varies in the whole operation period of the task of the time-constraint type 33. FIG. 19B is a table showing the unit accomplishment times (UAT) and the periods T used for multiplexing the three tasks of the unit group type. FIG. 19C is a diagram of the tables shown in FIGS. 19A and 19B. FIG. 20 A is a table showing the periods used for multiplexing (T) of the respective tasks of the unit group type. FIG. 20B is a table showing multiplex execution ratios (MR). FIG. 20C is a table showing the sums of the period used for multiplexing (T) and the sums of the multiplex execution ratios (MR) of the respective tasks of the unit group type. FIG. 20D is a table showing the priorities of efficient task combinations with reference to the sums of the periods used for multiplexing.

These tables allow the operator to select the appropriate combination of the tasks with reference to the sums of the periods used for multiplexing or those of the multiplex execution ratios.

Further, the above-mentioned priorities and values of the multiplexing efficiency also allow the operator to select the most efficient combination of the tasks at every point in consideration of the characteristics of the respective tasks and whether or not the task can be processed. For example, if a today's meeting is the task 33 and there is no big difference among the tasks AA, BB, and CC in view of the priorities and importance, a first priority may be selected to multiplex the today's task 33 and the task BB.

If the priority or importance of the task BB is smaller than the tasks AA or CC, a second priority may be selected to multiplex the today's task 33 and the task AA. In this manner, it is possible to support the operator in selecting and implementing the efficient multiple operations, by exhibiting the periods used for multiplexing and the execution ratios.

Second Embodiment

In the second embodiment, it is configured that the same tasks as the first embodiment are registered. The task execution ratio (TER) is calculated for all the combinations of the tasks, as shown in FIG. 21A. FIG. 21B is a table showing the sum of the task execution ratios together with the priorities of the efficient task combinations shown in FIG. 20D, on the basis of the task execution ratios.

Referring to FIG. 21B, basically, the combination having the longest sum of the periods used for multiplexing is regarded as the most efficiently multiplexed operations. However, if the importance or urgency is set extremely high as the characteristic of the operation of the unit group type, this information is provided for the operator as a reference of selecting the operation of a specific unit group type having a high execution ratio rather than selecting the operation for efficiency in multiplexing.

Specifically, if the importance of the task BB is high, the task BB is efficiently multiplexed with the task 11, as shown in FIG. 21A. Then, referring to FIG. 20D, the task of the second priority, a higher one, can be chosen from the tasks of the second and third priorities. The sums of the task execution ratios are effective indexes for increasing the whole task execution ratio of all the registered tasks. In FIG. 21B, the second priority is selected in consideration of the indexes. In this manner, if the priority specific to the task and management state are specified in addition to the period used for multiplexing and the execution ratio, the task execution ratio enables the operator to support the multitask selection and implementation.

As described above, the appropriateness for multiplexing the operations is determined on the basis of the characteristics of the operations to be multiplexed. This makes it possible to process multiple operations in parallel efficiently.

The operation supporting method in the above-mentioned aspect may further include recognizing a content of the operation being processed from among a combination of the operations determined by the determination portion and executing a process related to the operation recognized by the recognition portion. It is possible to automatically activate the application corresponding to the operation recognized, and the operation can be processed simultaneously in a more efficient manner.

The operation supporting method in the above-mentioned aspect may further include displaying a combination of the operations determined by the determination portion. It is possible to start the multitasking process without recognizing the tasks being multiplexed, and the operation can be processed simultaneously in a more efficient manner.

An operation supporting method of the present invention is realized with a CPU (Central Processing Unit), ROM (Read Only Memory), RAM (Random Access Memory), and the like, by installing a program from a portable memory device or a storage device such as a hard disc device, CD-ROM, DVD, or a flexible disc or downloading the program through a communications line. Then the steps of program are executed as the CPU operates the program. This program may execute a step of obtaining characteristics of an operation to be multiplexed and another step of determining appropriateness of multiple operations to be multiplexed on the basis of the characteristics thereof. The memory portion 300 corresponds to a memory portion, the multiplexing determination portion 400 corresponds to a determination portion, the registration portion 200 corresponds to a registration portion, the executing operation recognizing portion 600 corresponds to a recognition portion, the CPU 700 corresponds to a control portion, the display portion 500 corresponds to a display portion, and the memory portion 300 corresponds to a combination memory portion. The task characteristics correspond to characteristics of an operation to be multiplexed.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-027670 filed on Feb. 3, 2005 including specification, claims, drawings, and abstract is incorporated herein by reference in its entirety.

What is claimed is:

1. An operation supporting apparatus comprising:
   a non-transitory memory portion that when executed by a computer stores characteristics of an operation to be multiplexed;
   a determination portion that determines, using at least one computer processor, whether multiple operations can be multiplexed on the basis of the characteristics thereof stored in the memory portion, and a characterization portion that categorizes multiple operations as a time constraint type operation in which a user is constrained by time until completion of the operation, or a unit group type operation in which the user is unconstrained by time in completing the operation, wherein for the time constraint type operations, the characteristics of the operation include at least a task attention interval (TAI) which is calculated based upon a degree of concentration of the consciousness of the user on the operation in a period of time, which is further based upon designating an expected amount of time a user will have to provide a particular level of concentration on the operation for each of a plurality of intervals over which the operation is processed, and for each unit group type operation, the characteristics of the operation include at least an unit accomplishment time (UAT) that is based upon an estimated time period necessary for completing one unit of the unit group operation, and wherein the determination portion further is programmed to calculate at least two of a sum of periods in which said multiple operations can be processed simultaneously, a sum of multiplex execution ratios (MRs) for combinations of multiple operations that can be processed simultaneously, and a sum of task execution ratios (TERs) of the unit group type operations when said multiple operations are processed simultaneously, on the basis of the characteristics of the operation to be multiplexed, and to determine whether said multiple operations can be multiplexed according to whether said type constraint type operations can be multiplexed with said unit group type operations based on combining said at least two sums that have been calculated, and on a comparison between the TAIs and UATs of the multiple operations.

2. The operation supporting apparatus according to claim 1, further comprising a registration portion that registers the characteristics of the operation to be multiplexed.

3. The operation supporting apparatus according to claim 1, further comprising:
a recognition portion that recognizes a content of the operation being processed from among a combination of the operations determined by the determination portion; and
an execution portion that executes a process related to the operation recognized by the recognition portion.

4. The operation supporting apparatus according to claim 1, further comprising:
a recognition portion that recognizes a content of the operation being processed from among a combination of the operations determined by the determination portion; and
a control portion that controls to activate an application corresponding to the operation recognized by the recognition portion.

5. The operation supporting apparatus according to claim 1, further comprising an input portion, with which a given combination of the operations is selected from among multiple combinations of the operations determined by the determination portion.

6. The operation supporting apparatus according to claim 1, further comprising a display portion that displays a combination of the operations determined by the determination portion.

7. The operation supporting apparatus according to claim 1, further comprising a combination memory portion that stores a combination of the operations determined by the determination portion.

8. The operation supporting apparatus according to claim 1, further comprising a display portion that displays at least one of the sum of periods, the sum of the multiplex execution ratios (MRs), and the sum of the task execution ratios (TERs).

9. The operating supporting apparatus according to claim 8, further comprising an executing ratio maximization select portion that determines priorities of combinations of the multiple operations can be multiplexed based on the at least one of the sums,
wherein the display portion displays the priorities.

10. The operation supporting apparatus according to claim 1, wherein the determination portion determines whether said multiple operations can be multiplexed on the basis of the comparison between the UATs and a period used for multiplexing.

11. The operation supporting apparatus according to claim 1, wherein the determination portion calculates at least one of a sum of periods in which said multiple operations can be processed simultaneously, a sum of multiplex execution ratios (MRs) for combinations of multiple operations that can be processed simultaneously, and a sum of task execution ratios (TERs) of operations in which the user is unconstrained by time in completing the operation when said multiple operations are processed simultaneously, on the basis of the characteristics of the operation to be multiplexed, and determines priorities as to efficient combinations of the operations using the calculation.

12. The operation supporting apparatus according to claim 1, wherein the determination portion determines whether a specific operation can be multiplexed based on selecting operations from among said multiple operations.

13. The operation supporting apparatus according to claim 1, wherein the characteristics of the operation include a frequency of a user's concentration on the operation until a completion thereof and/or an estimated time necessary for completing an operation unit of the operation.

14. The operating supporting apparatus according to claim 8, further comprising:
an executing operation recognizing portion that detects a progress status of an operation and displays the progress status that has been detected.

15. The operating supporting apparatus according to claim 14, wherein the executing operation recognizing portion detects the progress status of the operation by detecting an activation of an application necessary for performing the operation.

16. An operation supporting method comprising:
registering characteristics of operations to be multiplexed; and
determining, by using at least one computer processor, whether the multiple operations can be multiplexed on the basis of the registered characteristics,
wherein the registered characteristics of the operations include, for each operation, categorizing the operation as a time constraint type operation in which a user is constrained by time until completion of the operation, or a unit group type operation in which the user is unconstrained by time in completing the operation;
if the operation is a time constraint type operation, the registered characteristics of the operation further include a task attention interval (TAI) which is calculated based upon a degree of concentration of the consciousness of the user on the operation in a period of time, which is further based upon designating an expected amount of time a user will have to provide a particular level of concentration on the operation during a plurality of intervals over which the operation is processed; and if the operation is an unit group type operation, the registered characteristics of the operation further include an unit accomplishment time (UAT) that is based upon an estimated time period necessary for completing one unit of the unit group operation; and wherein the determining comprises:

calculating, at least two of a sum of periods in which said multiple operations can be processed simultaneously, a sum of multiplex execution ratios (MRs) for combinations of multiple operations that can be processed simultaneously, and a sum of task execution ratios (TERs) of the unit group type operations when said multiple operations are processed simultaneously, on the basis of the registered characteristics of the operation to be multiplexed, and determining whether said multiple operations can be multiplexed on the basis of combining said at least two sums that have been calculated, and on the basis of a comparison between the TAIs and UATs of the multiple operations.

17. The operation supporting method as claimed in claim 16, further comprising:
recognizing a content of the operation being processed from among a combination of the operations determined by the determination portion; and
executing a process related to the operation recognized in the recognition step.

18. The operation supporting method as claimed in claim 16, further comprising displaying a combination of the operations that the determining step has determined can by multiplexed.

19. A non-transitory storage medium readable by a computer, the storage medium storing a program of instructions executable by the computer to perform the function for operation supporting comprising:
obtaining characteristics of an operation to be multiplexed; and
determining using a computer processor whether multiple operations can be multiplexed on the basis of the characteristics thereof, wherein the characteristics each of operation include categorizing the operation as a time constraint type operation in which a user is constrained by time until completion of the operation, or a unit group type operation in which the user is unconstrained by time in completing the operation;

if the operation is a time constraint type operation, the characteristics of the operation further include a task attention interval (TAI) which is calculated based upon a degree of concentration of the consciousness of the user on the operation in a period of time, which is further based upon designating an expected amount of time a user will have to provide a particular level of concentration on the operation during a plurality of intervals over which the operation is processed;

if the operation is an unit group type operation, the characteristics of the operation further include an unit accomplishment time (UAT) that is based upon an estimated time period necessary for completing one unit of the unit group operation; and wherein the determining comprises:

calculating at least two of a sum of periods in which said multiple operations can be processed simultaneously, a sum of multiplex execution ratios (MRs) for combinations of multiple operations that can be processed simultaneously, and a sum of task execution ratios (TERs) of the unit group type operations when said multiple operations are processed simultaneously, on the basis of the registered characteristics of the operation to be multiplexed, and determining whether said multiple operations can be multiplexed on the basis of combining said at least two sums that have been calculated, and on the basis of a comparison between the TAIs and UATs of the multiple operations.

* * * * *